United States Patent [19]
Harada et al.

[11] Patent Number: 6,107,358
[45] Date of Patent: Aug. 22, 2000

[54] WATER-ABSORBENT RESIN AND METHOD FOR PRODUCTION THEREOF

[75] Inventors: Nobuyuki Harada, Osaka; Koji Miyake; Yoshihiro Motono, both of Hyogo; Hideyuki Tahara, Osaka; Takumi Hatsuda, Hyogo; Teruyuki Kanto, Hyogo; Akito Yano, Hyogo; Yorimichi Dairoku, Hyogo; Kazuki Kimura, Hyogo; Yasuhiro Fujita, Hyogo, all of Japan

[73] Assignee: Nippon Shokubai Co., Ltd., Osaka, Japan

[21] Appl. No.: 08/915,557

[22] Filed: Aug. 21, 1997

[30] Foreign Application Priority Data

| Aug. 23, 1996 | [JP] | Japan | 8-241433 |
| Aug. 23, 1996 | [JP] | Japan | 8-241434 |
| Aug. 23, 1996 | [JP] | Japan | 8-241435 |
| Mar. 14, 1997 | [JP] | Japan | 9-082147 |
| Mar. 17, 1997 | [JP] | Japan | 9-062701 |
| Jul. 29, 1997 | [JP] | Japan | 9-203113 |

[51] Int. Cl.$^7$ ..................... C08J 9/30
[52] U.S. Cl. ............ 521/133; 521/87; 521/88; 521/94; 521/142; 521/149; 524/502; 524/555; 524/556; 524/560; 524/845
[58] Field of Search ................. 521/87, 88, 94, 521/133, 142, 149; 524/502, 555, 556, 560, 845

[56] References Cited

U.S. PATENT DOCUMENTS

| 4,286,082 | 8/1981 | Tsubakimoto et al. . |
| 4,656,232 | 4/1987 | Nakaki et al. . |
| 5,118,719 | 6/1992 | Lind .......................................... 521/92 |
| 5,314,420 | 5/1994 | Smith et al. ............................ 521/149 |
| 5,328,935 | 7/1994 | Van Phan et al. . |
| 5,338,766 | 8/1994 | Phan et al. . |
| 5,354,290 | 10/1994 | Gross . |
| 5,403,870 | 4/1995 | Gross . |
| 5,712,316 | 1/1998 | Dahmen et al. . |

FOREIGN PATENT DOCUMENTS

| 736060B1 | 10/1996 | European Pat. Off. . |
| 744435A1 | 11/1996 | European Pat. Off. . |
| 38 31 261 A1 | 3/1990 | Germany . |
| 44 18 818 A1 | 1/1995 | Germany . |
| 195 40 951 A1 | 5/1997 | Germany . |
| 57-44627 | 3/1982 | Japan . |
| 58-42602 | 3/1983 | Japan . |
| 58-180233 | 10/1983 | Japan . |
| 59-62665 | 4/1984 | Japan . |
| 60-18690 | 5/1985 | Japan . |
| 61-16903 | 1/1986 | Japan . |
| 3-115313 | 5/1991 | Japan . |
| 95/17455 | 6/1995 | WIPO . |
| 96/17884 | 6/1996 | WIPO . |
| WO 97/17397 | 5/1997 | WIPO . |

OTHER PUBLICATIONS

Chemical Abstract—Abstract No. 73389, "Water Absorbents," vol. 115, No. 8, Aug. 26, 1991, p. 84.
European Patent Office Search Report, Appln. No. EP 97 30 6427, Jul. 14, 1998.

*Primary Examiner*—John M. Cooney, Jr.
*Attorney, Agent, or Firm*—Burns, Doane, Swecker & Mathis, LLP

[57] ABSTRACT

A method for the production of a water-absorbent resin capable of fast water absorption is disclosed which comprises the steps of dispersing bubbles of an inert gas in an aqueous monomer solution of a mixture of a water-soluble unsaturated monomer and a water-soluble cross-linking monomer and subjecting the mixture to copolymerization under the condition that a volume of the monomer solution wherein the inert gas is dispersed is in the range of 1.02 to 5 times of a volume of non-dispersant state.

19 Claims, 4 Drawing Sheets

FIG.1
FIG.2
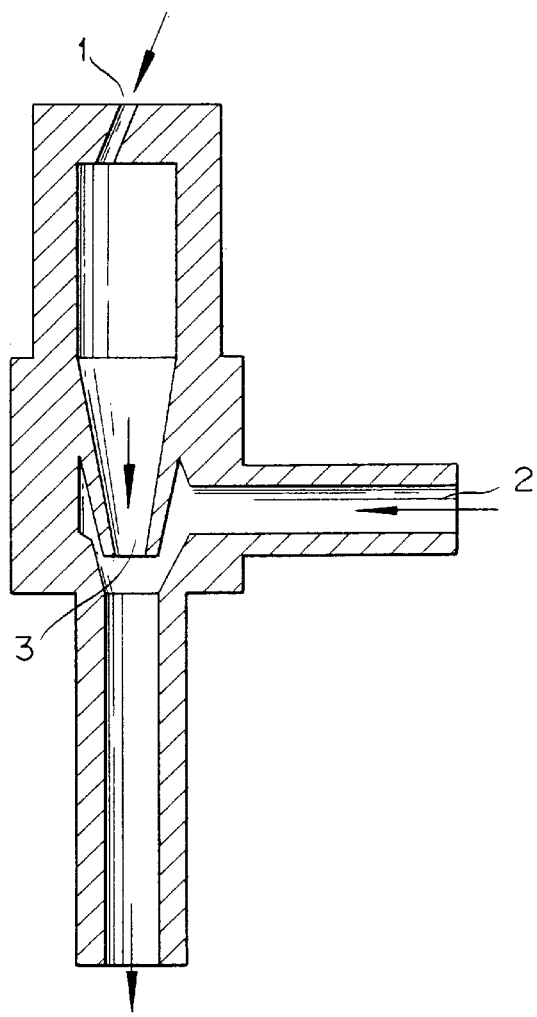
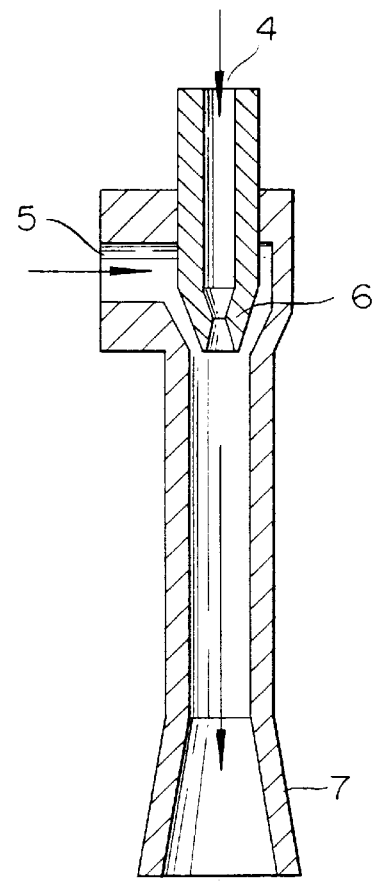
FIG.3
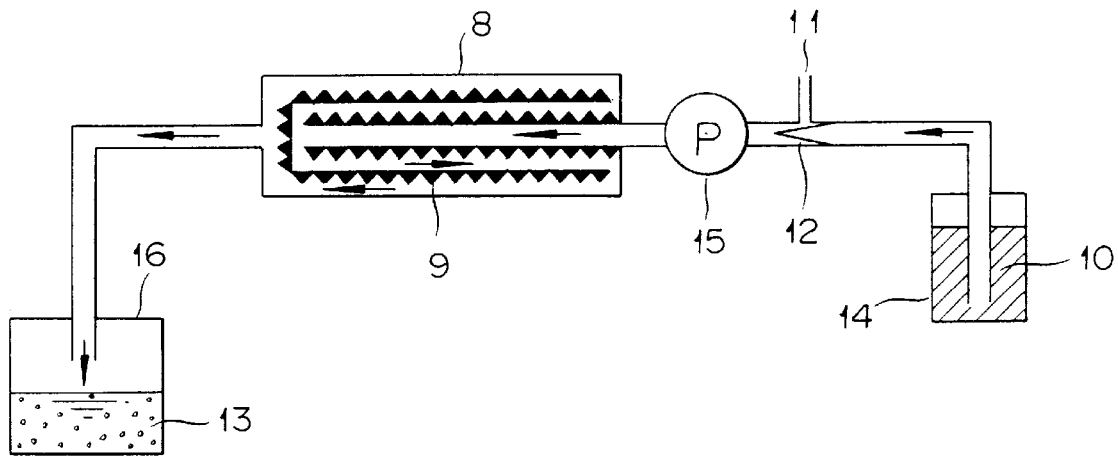

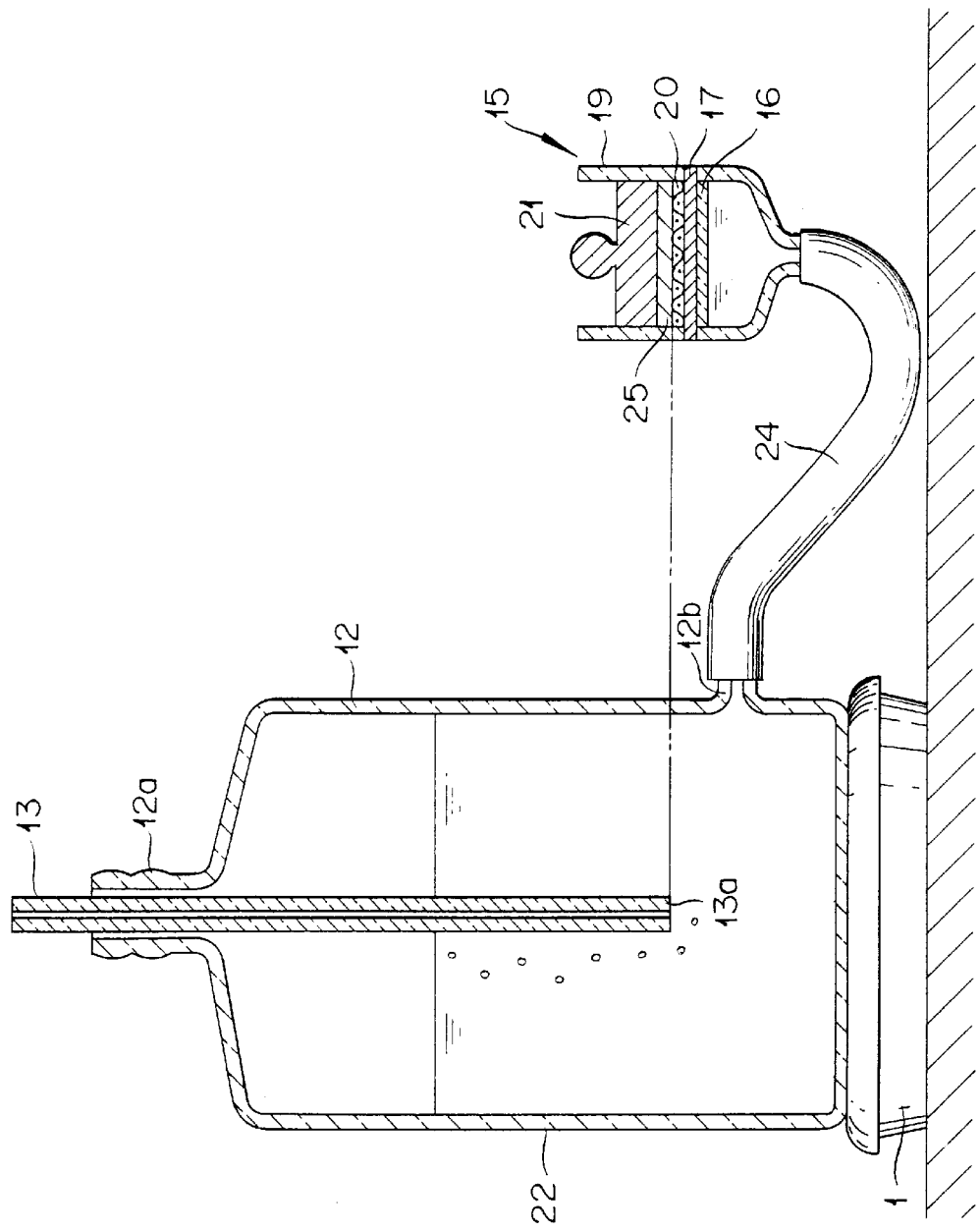

WATER-ABSORBENT RESIN AND METHOD FOR PRODUCTION THEREOF

BACKGROUND OF THE INVENTION

1. Field of the Invention

This invention relates to a war-absorbent resin allowing fast absorption without and under load, drying easily, and incurring only a small load during pulverization and a method for the production thereof. Still more particularly, it relates to a method for the production of a hydrophilic polymer allowing fast absorption, drying easily, and incurring only a small load during pulverization.

2. Description of the Prior Art

In recent years, water-absorbent resins capable of absorbing some tens to some hundreds of times their own weight of water have been developed. The water-absorbent resins of various types have been finding utility in applications requiring absorption and retention of water such as in the field of agriculture and horticulture, the field of fresh and perishable foodstuffs, and the field of industrial products requiring protection against dew formation and refrigeration as well as the field of hygienic materials including sanitary goods and disposable diapers.

As typical examples of the known water-absorbent resins, hydrolyzed starch-acrylonitrile graft polymer (JP-B-49-43,395), neutralized starch-acrylic acid graft polymer (JP-A-51-125,468), saponified vinyl acetate-acrylic acid copolymer (JP-A-52-14,689), hydrolyzed acrylonitrile copolymer or acrylamide copolymer (JP-B-53-15,959), cross-linked products thereof, self-cross-linked polysodium acrylate obtained by the reversed-phase suspension polymerization (JP-A-53-46,389), and partially neutralized cross-linked polyacrylic acid (JP-A-55-84,304) may be cited.

The quality that is required by a given water-absorbent resin varies with the kind of use for which the resin is intended. The properties which the water-absorbent resins intended for sanitary materials are expected to possess include high ratio of cubic expansion due to absorption under the load, high speed of absorption, and a marked ability to pass water, for example. These properties, however, do not always a positive correlation. It has been difficult to improve these properties all at once.

With a view to improving the absorbing speed of a given water-absorbent resin, attempts have been under way to enlarge the surface area of the water-absorbent resin by decreasing the particle diameter of the water-absorbent resin or molding the resin in the form of granules or scales. Generally, when the water-absorbent resin is molded in the form of particles of a small diameter, however, the water-absorbent resin particles, on contact with an aqueous liquid, form the so-called "wet clusters of powder" at a sacrifice of the absorbing speed. When the water-absorbent resin is subjected to size enlargement, the individual pellets of the product of size enlargement on contact with an aqueous liquid undergo the phenomenon of conversion into "wet clusters of powder" and rather suffer a decrease of the absorbing speed. When the water-absorbent resin is molded in the form of thin pieces, the produced thin pieces have no fully sufficient absorbing speed because this molding induces gel blocking in spite of the capability of improving the absorbing speed. Further, the formation of the water-absorbent resin in the form of thin pieces is uneconomical because the produced water-absorbent resin is inevitably so bulky as to require large facilities for transportation and storage.

Techniques for preventing the formation of wet clusters of powder and improving the absorbing speed by cross-linking the molecular chains in the surface region of the water-absorbent resin and increasing the cross-link density of the surface layer thereof have been proposed. These techniques have been disclosed in JP-A-57-44,627, JP-A-58-42,602, JP-B-6018,690, JP-A-58-180,233, JP-A-59-62,665, and JP-A-61-16,903, for example. These techniques have indeed improved the absorbing speed to a certain extent. The water-absorbent resins obtained by these techniques, however, are actually in such a state that minute particles having a smaller particle diameter than the optimum diameter aimed at by the techniques are contained in a considerable ratio. When the water-absorbent resin of this quality is used, it fails to show a fully satisfactory absorbing speed and incurs a decline in the ability to pass liquid in consequence of gel blocking.

The improvement of the absorbing speed by the use of a foaming agent, namely a method for pyrolytically forming bubbles in the water-absorbent resin, relies on the heat generated by polymerization to start the foaming has entailed such problems as (1) the polymerization in process entraining a large change in volume, allowing no easy control, and producing a polymer lacking homogeneity in quality and having a particularly high content of water-insoluble components and (2) the produced foam lacking stability of pore diameter and distribution and allowing now sufficient control of absorbing speed.

When this method is carried out by the use of an azo based polymerization initiator, the amount of this initiator must be increased to form bubbles in an amount enough to improve the absorbing speed and consequently the content of water-soluble components in the produced polymer tends to increase. Further, the method using the azo based polymerization initiator, similarly to the method using the foaming agent, has the problem that the polymerization in process will entrain a large change of volume and will consequently allow no easy control of pore particle and distribution of bubbles.

When this method implements the polymerization in the presence of dispersion of such a water-insoluble foaming agent as a volatile organic compound, though the polymerization can be effected relatively stability, the method incurs heavy waste of energy, proves expensive, and lacks practical serviceability because the polymerization requires a special apparatus from the viewpoint of safety on account of the use of the volatile organic compound and the used volatile organic compound is discharged from the system.

These water-absorbent resins, however, are invariably at a disadvantage in showing no sufficient absorbing speed in the without and under load, allowing no easy drying, suffering a large load during the pulverization, lacking uniformity of pore diameter, and having a large content of water-soluble components.

In contrast, the present invention has realized a water-absorbent resin which allows production of a foam uniform in pore diameter and distribution of bubbles, permits fast absorption of water without and under load, dries easily, and suffers only a small load during the pulverization and a method for the production of thereof.

An object of this invention, therefore, is to provide a water-absorbent resin capable of fast absorption of water and a method for the production thereof.

Another object of this invention is to provide a water-absorbent resin allowing fast absorption of water without and under load, drying easily, and suffering only small load during the pulverization and a method for the production thereof.

Still another object of this invention is to provide a water-absorbent resin having a large capacity for water absorption and having only a small content of water-soluble components.

A further object of this invention is to provide a method for the production of a hydrophilic polymer having bubbles dispersed therein.

Yet another object of this invention is to provide a method for the production of a hydrophilic polymer having a high water-absorbent speed or solving speed.

A still further object of this invention is to provide a water-absorbent resin which exhibits a very high ratio of cubic expansion due to water absorption under load in spite of a small particle diameter, possesses a large absorption speed due to the small particle diameter, and serves favorably for such hygienic materials as disposable diapers, sanitary napkins, and pads intended for patients of incontinence and a method for the production thereof.

SUMMARY OF THE INVENTION

The objects mentioned above are accomplished by the following items (1)–(21).

(1) A method for the production of a water-absorbent resin capable of fast water absorption, comprising the steps of dispersing bubbles of an inert gas in an aqueous monomer solution of a mixture of a water-soluble unsaturated monomer and a water-soluble cross-linking monomer and subjecting the mixture to copolymerization under the condition that a volume of the monomer solution wherein the inert gas is dispersed is in the range of 1.02 to 5 times of a volume of non-dispersed state.

(2) A method according to item (1) above, wherein the inert gas bubbles are dispersed so that an average pore diamer of the dispersed inert gas is in the range of 10 to 500 µm.

(3) A method according to item (1) or item (2) above, wherein the aqueous monomer solution contains a surfactant.

(4) A method according to Item (3) above, wherein the amount of the surfactant is in the range of 0.001–30 parts by weight, based on 100 parts by weight of the total amount of the water-soluble unsaturated monomer and the water-soluble cross-linking monomer.

(5) A method according to any of items (1)–(4) above, wherein the volume of the aqueous monomer solution having the bubbles of the inert gas dispersed therein is not less than 1.08 to 4 times the volume of the solution having no inert gas dispersed therein.

(6) A method according to any of items (1)–(5) above, wherein the dispersion of the bubbles is accomplished by introducing the inert gas into the aqueous solution.

(7) A method according to any of items (1)–(6) above, wherein the dispersion of the bubbles is accomplished by forced agitation of the aqueous solution at a high speed.

(8) A method according to any of items (1)–(7) above, wherein the dispersion of the bubbles is accomplished by adding a foaming agent to the aqueous solution.

(9) A method according to any of items (1)–(8), wherein the copolymerization is carried out using a redox polymerization initiator.

(10) A method according to any of items (1)–(8) above, which further comprises treating the produced water-absorbent resin with a surface cross-linking agent.

(11) A water-absorbent resin capable of fast absorption of water, produced by the method set forth in any of items (1)–(10) above.

(12) A method for the production of a hydrophilic polymer, comprising the steps of mixing an aqueous monomer solution containing a water-soluble ethylenically unsaturated monomer and a gas by fluid mixing thereby obtaining an aqueous monomer solution having bubbles dispersed therein and then polymerizing the monomer in the state of having the bubbles dispersed therein.

(13) A method according to item (12) above, wherein the aqueous monomer solution and the gas are mixed by causing either of the two fluids to be spouted through a nozzle into a current of the other fluid parallelly to the current.

(14) A method according to item (12) above, wherein the mixing of the aqueous monomer solution and the gas is accomplished by introducing the two fluids into a mixing zone provided with irregularities and/or packing.

(15) A method according to any of items (17) to (14) above, wherein the aqueous monomer solution contains a surfactant.

(16) A method according to any of items (12)–(15) above, wherein the gas is an inert gas.

(17) A method according to any of items (12)–(16) above, wherein the aqueous monomer solution contains a cross-linking agent.

(18) A method according to any of items (12)–(17) above, which further comprises subjecting the produced hydrophilic polymer to a surface treatment.

(19) A method for the production of a water-absorbent resin, comprising a step of mixing water-absorbent resin particles with either a surface cross-linking agent containing at least two groups capable of reacting with the functional group contained in the water-absorbent resin or a mixed solution of the cross-linking agent and an organic solvent and a step of mixing the mixture of the water-absorbent resin particles and the surface cross-linking agent with an aqueous liquid.

(20) A method according to item (19) above, wherein the surface cross-linking agent contains at least two kinds of surface cross-linking agents differing in reactivity.

(21) A method according to any of items (19)–(20) above, wherein the aqueous liquid is water or a mixed solvent of water and a water-soluble organic solvent.

Since this invention is constructed as described above, the water-absorbent resin according to this invention exhibits a high water absorption speed without and under load and a marked ability to absorb water and has only a small content of water-soluble components. Thus, the water-absorbent resin is perfectly suitable for various applications requiring absorption and retention of water such as in the field of hygienic materials including sanitary goods and disposable diapers, the field of agriculture and horticulture, the field of foodstuffs is requiring retention of freshness, and the field of industrial products requiring protection against dew formation and refrigeration.

The water-absorbent resin of this invention has a minute particle diameter and an outstanding ability to absorb water under load. When it is used in a diaper or a sanitary cotton, therefore, it can absorb the urine promptly in a large volume without entailing any blockage with a swelled gel.

Further, by the method of production according to this invention, an water-absorbent resin exhibiting a high water absorption speed and excelling in the ability to absorb water under a load can be easily produced.

BRIEF DESCRIPTION OF THE DRAWING

FIG. 1 is a cross section illustrating one example of an aspirator to be used by the method of this invention.

FIG. 2 is a cross section illustrating one example of an ejector to be used by the method of this invention.

FIG. 3 is a cross section illustrating a mixing zone containing irregularities in a gap to be used by the method of this invention.

FIG. 6 is a cross section illustrating an apparatus for the determination of a ratio of cubic expansion of a water-absorbent resin by water absorption under a load.

DESCRIPTION OF THE PREFERRED EMBODIMENT

Figure 4:
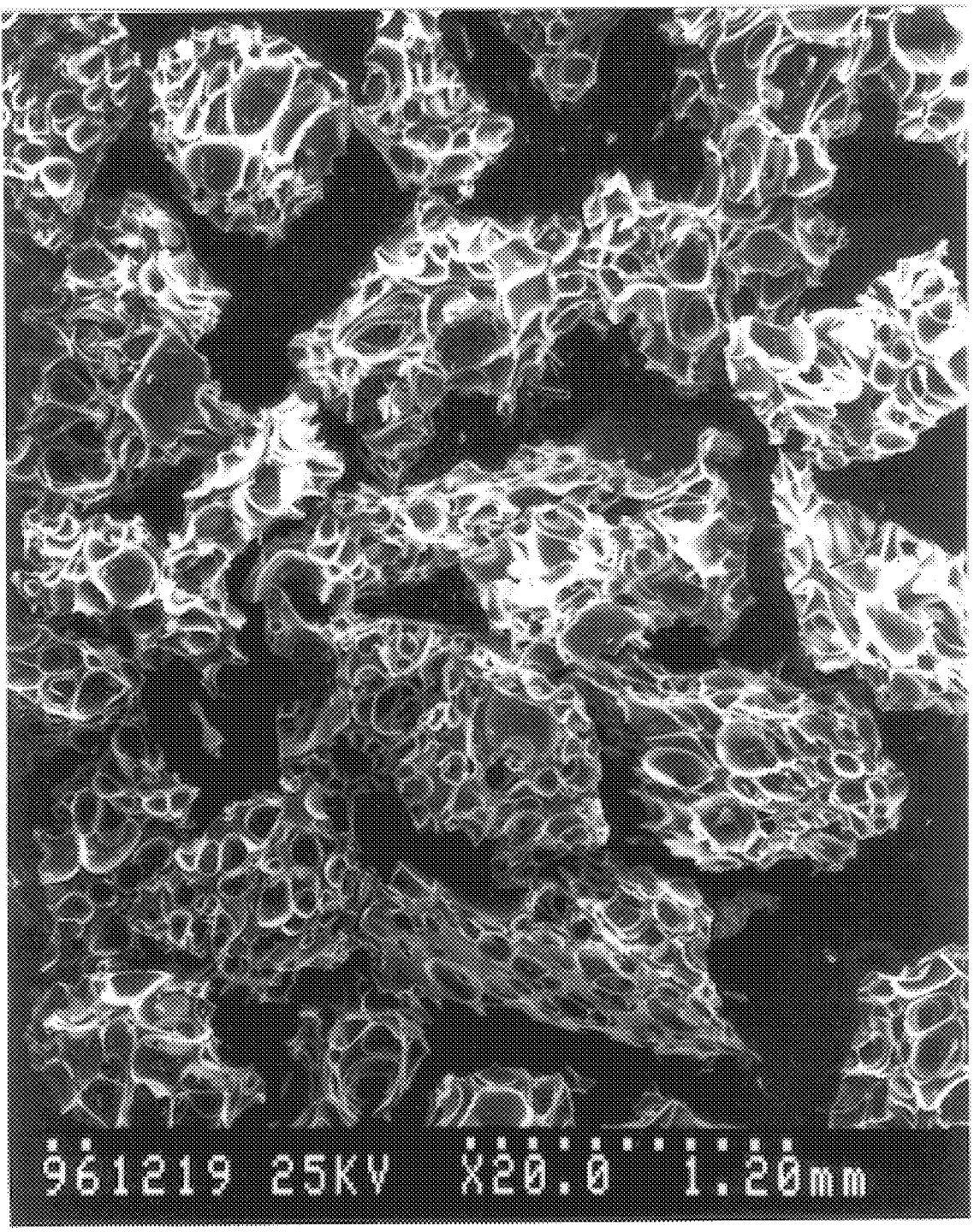
FIG. 4 is an electron micrograph showing the foamed state of a water-absorbent resin composition of this invention obtained in Example 11.

This invention concerns a method for the production of a water-absorbent resin capable of fast water absorption, comprising the steps of dispersing bubbles of an inert gas in an aqueous monomer solution of a mixture of a water-soluble unsaturated monomer and a water-soluble cross-linking monomer and subjecting the mixture to copolymerization under the condition that a volume of monomer solution wherein the inert gas is dispersed is in the range of 1.02 to 5 times of a volume of non-dispersed state.

As typical examples of the water-soluble unsaturated monomer, anionic monomers such as (meth)acrylic acid, (anhydrous) maleic acid, fumaric acid, crotonic acid, itaconic acid, 2-(meth)-acryloyloxyethane sulfonic acid, 2-(meth)acryloyloxypropane sulfonic acid, 2-(meth)acrylamide-2-methylpropane sulfonic acid, vinyl sulfonic acid, and styrene sulfonic acid and salts thereof; nonionic hydrophilic group-containing monomers such as (meth)-acrylamide, N-substituted (meth)acrylamide, 2-hydroxyethyl (meth)acrylate, 2-hydroxypropyl (meth) acrylate, methoxypoly-ethylene glycol (meth)acrylate, poly-ethylene glycol (meth)-acrylate, N-vinyl pyrrolidone, and N-vinyl acetamide; amino group-containing unsaturated monomers such as N,N-dimethylaminoethyl(meth)acrylate, N,N-dimethylaminopropyl(meth)acrylate, and N,N-dimethylaminopropyl(meth)acrylamide; and quaternization products thereof may be cited. The water-soluble unsaturated monomer may incorporate therein an acrylic ester such as methyl (meth)acrylate, ethyl (meth)acrylate, or butyl (meth)acrylate and a hydrophobic monomer such as vinyl acetate or vinyl propionate in an amount incapable of inhibiting the hydrophilicity of the produced polymer to an excessive extent. The monomers mentioned above may be used either singly or in the form of a mixture of two or more members. In consideration of the various water absorption properties of the ultimately produced water-absorbent material, it is appropriate to use at least one member selected from the group consisting of (meth)acrylic acid (and salts thereof), 2-(meth)acryloyloxyethane sulfonic acid (and salts thereof), 2-(meth)acrylamide-2-methylpropane sulfonic acid (and salts thereof), (meth)acrylamide, methoxypolyethylene glycol (meth)acrylate, N,N-dimethylaminoethyl (meth) acrylate or quaternization products thereof. Most advantageously in this case, the (meth)acrylic acid has a portion thereof in the range of 30–90 mol %, particularly 50–90 mol %, neutralized with a basic substance.

As typical examples of the water-soluble cross-linking monomer, compounds containing at least two ethylenically unsaturated groups in the molecular unit thereof such as ethylene glycol di(meth)acrylate, diethylene glycol di(meth) acrylate, triethylene glycol di(meth)acrylate, propylene glycol di(meth)acrylate, polyethylene glycol di(meth)acrylate, trimethylolpropane di(meth)acrylate, trimethylolpropane tri (meth)acrylate, penta-erythritol tri(meth)acrylate, pentaerythritol tetra(meth)-acrylate, N,N'-methylene bis (meth) acryl amide, triallyl isocyanurate, trimethylolpropane di(meth)allyl ether, triallyl amine, tetraallyloxy ethane, and glycerol propoxy triacrylate; polyhydric alcohols such as ethylene glycol, diethylene glycol, triethylene glycol, poly-ethylene glycol, glycerol, polyglycerol, propylene glycol, 1,4-butanediol, 1,5-pentanediol, 1,6-hexanediol, neopentyl alcohol, diethanol amine, tridiethanol amine, polypropylene glycol, polyvinyl alcohol, pentaerythritol, sorbit, sorbitan, glucose, mannit, mannitan, sucrose, and glucose; polyglycidyl ethers such as ethylene glycol diglycidyl ether, polyethylene glycol diglycidyl ether, and glycerol triglycidyl ether; haloepoxy compounds such as epichlorohydrin and α-methyl chlorohydrin; polyaldehydes such as glutar aldehyde and glyoxal; polyamines such as ethylene diamine; hydroxides, halide, carbonates, and oxides of metals of Groups 2A, 3B, and 8 in the Periodic Table of the Elements such as calcium hydroxide, calcium chloride, calcium carbonate, calcium oxide, magnesium chloro-borax, magnesium oxide, aluminum chloride, zinc chloride, and nickel chloride; borates such as borax, and polyvalent metal compounds such as aluminum isopropylate may be cited. These water-soluble cross-linking monomers may be used either singly or in the form of a mixture of two or more members. Most advantageously, the water-soluble cross-linking monomer uses a compound containing two or more ethylenically unsaturated groups in the molecular unit thereof as a cross-linking agent.

This invention allows additional use of a cross-linking agent containing not less than two functional groups capable of copolymerizing with the water-soluble ethylenically unsaturated monomer or reacting with the functional group of the monomer and, owing to this additional use of the cross-linking agent, enables production of a hydrophilic polymer which excels in water absorption properties.

The ratio of the water-soluble cross-linking monomer to be used in this invention is in the range of 0.001–2 parts by weight, preferably 0.005–1 part by weight, based on 100 parts by weight of the water-soluble unsaturated monomer. If the ratio is less than 0.001 part by weight, the amount of water to be absorbed under applied pressure possibly will not be sufficient because of a proportionate increase in the ratio of the water-soluble component of the produced water-absorbent resin. If the ratio conversely exceeds 2 parts by weight, the amount of water to be absorbed by the produced water-absorbent resin possibly will be insufficient because of an increase in the cross-link density.

In the method of this invention, the concentration of the total amount of the water-soluble unsaturated monomer and the water-soluble cross-linking monomer relative to the amount of water is in the range of 15–50% by weight, preferably 25–40% by weight.

This invention further concerns a method for the production of a hydrophilic polymer, comprising the steps of mixing an aqueous monomer solution containing a water-soluble ethylenically unsaturated monomer and a gas by fluid mixing thereby obtaining an aqueous monomer solution having bubbles dispersed therein and then polymerizing the monomer in the state of having the bubbles dispersed therein.

In this case, the aqueous monomer solution and the gas are subjected to fluid mixing. The aqueous monomer solution and the gas are caused to assume a fluid state, for example, by being spouted or aspirated through a nozzle. When they are mixed in the fluid state, the gas can be dispersed uniformly and stably in the aqueous monomer solution. By polymerizing the monomer after the gas has been preparatorily dispersed in the aqueous monomer solution, the control of the pore diameter can be facilitated and the production of a porous hydrophilic polymer capable of fast water absorption can be obtained. The conventional polymerization using a foaming agent has entailed the problem that since the polymerization system is foamed by precipitating bubbles, the control of the pore diameter and the amount of bubbles is not necessarily easy and the production of a hydrophilic polymer of expected properties is attained only with difficulty. This invention allows the control of the pore diameter and the amount of bubbles to be easily attained because the polymerization of the monomer is carried out after the bubbles have been preparatorily dispersed in the aqueous monomer solution.

As a means to attain the fluid mixing, a procedure which comprises spouting one of the two fluids, i.e. the aqueous monomer solution and the gas, through a nozzle into the current of the other fluid thereby mixing the two fluids may be cited. As typical examples of this procedure, a method which attains the mixture of the aqueous monomer solution and the gas by causing the gas to flow through a nozzle parallelly into a current of the aqueous monomer solution spouted through another nozzle and a method which attains the mixture of the aqueous monomer solution and the gas by causing the aqueous monomer solution to flow through a nozzle parallelly into a current of the gas spouted through another nozzle may be cited. For the purpose of the fluid mixing, the two fluids may be spouted in parallel currents, counter currents, or perpendicular currents. They are preferred to be spouted in parallel currents. When they are spouted in parallel currents, the bubbles can be uniformly dispersed. When they are spouted in counter currents, they possibly send out splashes and suffer them to land on a wall and inevitably undergo polymerization thereon.

As typical examples of the device to be used for the fluid mixing, an aspirator and an ejector may be cited. The aspirator is a device which generally spouts a second fluid through a nozzle and aspirates and discharges a first fluid through an aspiration chamber. One example of the aspirator is illustrated in FIG. 1. While this aspirator is particularly contrived to enable the second fluid to engulf the first fluid easily by virtue of a rotary motion imparted to the second fluid, it does not need to be limited to the shape illustrated. With reference to FIG. 1, an aqueous monomer solution having bubbles dispersed therein is easily obtained by introducing the aqueous monomer solution through a first fluid inlet 1, spouting it through a nozzle 3, aspirating a gas through a second fluid inlet 2, and causing the gas to contact the aqueous monomer solution thereby effecting mixture of the two fluids.

The ejector, in terms of principle, is not different in any way from the aspirator except that the leading end of a diffuser 7 forms a flared nozzle. One example of the ejector is illustrated in FIG. 2. Again in this case, the ejector does not need to be limited to the shape illustrated. In this diagram, reference numeral 4 represents a first fluid inlet, reference numeral 5 a second fluid inlet, and reference numeral 6 a nozzle.

These devices are used for causing the aqueous monomer solution and the gas to contact each other and effecting fluid mixing of the two fluids. It maybe either of the two fluids, i.e. the aqueous monomer solution and the gas, that is spouted through the nozzle. This discrimination between the two fluids is not particularly critical.

This invention may attain the mixture of the aqueous monomer solution and the gas by introducing the two fluids into a mixing zone provided with irregularities and/or packing. The aqueous monomer solution and the gas may be brought into mutual contact for ensuant mixture in the mixing zone which is provided with irregularities and/or packing or the monomer and the gas which have undergone preparatory fluid mixing may be further mixed in the mixing zone. By performing the mixture in the mixing zone which is provided with irregularities, protuberances, vanes, a baffle plate, fins, or packing which impedes the current of the fluids, the bubbles can be dispersed further uniformly and stably in the aqueous monomer solution.

As a typical example of the mixing zone provided with irregularities or packing, such a mixing zone 8 as is illustrated in FIG. 3 may be cited. With reference to FIG. 3, an aqueous monomer solution 10 containing bubbles produced by fluid mixing and passed through an aspirator 12 and a gas 11 introduced through a gas inlet are supplied into gaps 9 provided with protuberances to produce an aqueous monomer solution having bubbles dispersed stably and uniformly therein and having a volume 1.1–5 times the volume of the aqueous monomer solution having no bubble dispersed therein. As typical examples of the device provided with such a mixing zone as described above, the product of Aikosha Seisakusho K.K. marketed under trademark designation of "Whip Auto Z" and the product of Deutsch F. Pfeifinger AG marketed under trademark designation of "Zanomat" may be cited. In the diagram, reference numeral 13 represents an aqueous monomer solution containing bubbles, reference numeral 14 a monomer preparation tank, reference numeral 15 a pump, and a reference numeral 16 a polymerization column.

This invention allows provision of rotary vanes as the mixing zone for stirring the aqueous monomer solution having bubbles dispersed therein. By the stirring, the aqueous monomer solution is enabled to have minute bubbles dispersed more uniformly and more stably therein. As a typical example of the device incorporating such rotary vanes in the mixing zone thereof, the product of Aikosha Seisakusho K.K. marketed under trademark designation of "Turbomix" may be cited.

The method of this invention is preferred to perform the polymerization or copolymerization reaction in the presence of a surfactant. The use of the surfactant enables the bubbles to be stably dispersed. Further by appropriately controlling the kind and the amount of the surfactant, the pore diameter and the water-absorbent speed of the hydrophilic polymer to be produced can be controlled. The surfactants of the class under discussion are known in various types such as, for example, anionic surfactants, nonionic surfactants, cationic surfactants, and amphoteric surfactants.

As typical examples of the anionic surfactant, fatty acid salts such as mixed fatty acid sodium soap, semi-hardened beef tallow fatty acid sodium soap, sodium stearate soap, potassium oleate soap, and castor oil potassium soap; alkyl sulfuric esters such as lauryl sodium sulfate, higher alcohol sodium sulfate, lauryl sodium sulfate, lauryl sulfuric triethanol amine; alkyl benzene sulfonates such as sodium dodecyl benzene sulfonate; alkyl napthalene sulfonates such as sodium alkyl naphthalene sulfonate; alkyl sulfosuccinates such as sodium dialkyl sulfosuccinate; alkyl diphenyl ether disulfonates such as sodium alkyl diphenyl ether disulfonate; alkyl phosphates such as potassium alkyl phosphate;

polyoxyethylene alkyl (or alkylallyl) sulfuric esters sodium polyoxyethylene lauryl ether sulfate, sodium polyoxyethylene alkyl ether sulfate, polyoxyethylene alkyl ether sulfuric acid triethanol amine, and sodium polyoxyethylene alkyl phenyl ether sulfate; special reactive type anionic surfactants; special carboxylic acid based surfactants; naphthalene sulfonic acid formalin condensates such as sodium salt of β-naphthalenesulfonic acid formalin condensate and sodium salt of special aromatic sulfonic acid formalin condensate; special polycarboxylic acid type macromolecular surfactants; and polyoxyethylene alkyl phosphoric esters may be cited.

As typical examples of the nonionic surfactant, polyoxy ethylene alkyl aryl ethers such as polyoxyethylene lauryl ether, polyoxyethylene cetyl ether, polyoxyethylene stearyl ether, polyoxyethylene oleyl ether, polyoxyethylene alkyl ethers like polyoxyethylene higher alcohol ethers, and polyoxyethylene nonyl phenyl ether; sorbitan fatty esters such as sorbitan monolaurate, sorbitan monopalmitate, sorbitan monostearate, sorbitan tristearate, sorbitan monooleate, sorbitan trioleate, sorbitan sesquioleate, and sorbitan distearate; polyoxyethylene sorbitan fatty esters such as polyoxyethylene sorbitan monolaurate, polyoxyethylene sorbitan monolaurate, polyoxyethylene sorbitan monopalmitate, polyoxyethylene sorbitan monostearate, polyoxy-ethylene sorbitan tristearate, polyoxyethylene sorbitan mono-oleate, and polyoxyethylene sorbitan trioleate; polyoxyethylene sorbitol fatty esters such as tetraoleic acid polyoxyethylene sorbit; glycerin fatty esters such as glycerol monostearate, glycerol monooleate, and self-eumlsifying glycerol monostearate; polyoxyethylene fatty esters such as polyethylene glycol mono-laurate, polyethylene glycol monostearate, polyethylene glycol distearate, and polyethylene glycol monooleate; polyoxyethylene alkyl amines; polyoxyethylene hardened castor oil; and alkyl alcohol amines may be cited.

As typical examples of the cationic surfactant and the amphoteric surfactant, alkyl amine salts such as coconut amine acetate and stearyl amine acetate; quaternary ammonium salts such as lauryl trimethyl ammonium chloride, stearyl trimethyl ammonium chloride, cetyl trimethyl ammonium chloride, distearyl dimethyl ammonium chloride, and alkylbenzyl dimethyl ammonium chloride; alkyl betaines such as lauryl betaine, stearyl betaine, and lauryl carboxymethyl hydroxyethyl imidazolinium betaine; and amine oxides such as lauryl dimethyl amine oxide may be cited.

The surfactants further include fluorine based surfactants. The use of a fluorine based surfactant enables the bubbles of an inert gas to remain stably dispersed in the aqueous monomer solution for a long time. It also allows easy control of the amount and the particle diameter of the bubbles. The produced water-absorbent resin is a porous foam having a high absorption speed. The fluorine based surfactant to be used in this invention is known in various types. One example of the fluorine type surfactant is a standard surfactant having the lipophilic group thereof converted to a perfluoroalkyl group by the substitution of hydrogen atoms with fluorine atoms. This surfactant enjoys a prominently strengthened surface activity.

The fluorine based surfactant, by varying the hydrophilic groups thereof, is converted into the four types, i.e. anionic type, nonionic type, cationic type, and amphoteric type. More often than not, the fluorine type surfactant uses a fluorocarbon chain of a fixed configuration for the hydrophobic group thereof. The carbon chain to be used as the hydrophobic group may be a straight chain or a branched chain. Typical fluorine based surfactants are as follows.

Fluoroalkyl ($C_2$–$C_{10}$) carboxylic acids,

Disodium N-perfluorooctane sulfonyl glutamate,

Sodium 3-[Fluoroalkyl ($C_6$–$C_{11}$)oxy]-1-alkyl ($C_3$–$C_4$) sulfonate,

Sodium 3-[ù-Fluoroalkanoyl ($C_6$–$C_8$)-N-ethylamino]-1-propane sulfonate,

N-[3-(perfluorooctane sulfonamide)propyl]-N,N-dimethyl-N-carboxymethylene ammonium betaine, Fluoroalkyl ($C_{11}$–$C_{20}$) carboxylic acid, Perfluoroalkyl carboxylic acid ($C_7$–$C_{13}$), Perfluorooctane sulfonic acid diethanol amide, Perfluoroalkyl ($C_4$–$C_{12}$)sulfonates (Li, K, Na, etc), N-propyl-N-(2-hydroxyethyl)perfluorooctane sulfonamide, Perfluoroalkyl ($C_6$–$C_{10}$) sulfon amide propyl trimethyl ammonium salt, Perfluoroalkyl ($C_6$–$C_{10}$)-N-ethylsulfonyl glycine salt (K), Phosphoric acid bis(N-perfluorooctyl sulfonyl-N-ethylamino-ethyl), Monoperfluoroalkyl ($C_6$–$C_{16}$) ethyl phosphoric esters, Perfluoroalkyl quaternary ammonium iodide (a cationic fluorine type surfactant, produced by Sumitomo-3M K.K. and marketed under trademark designation of "Fluorad FC-135"), Perfluoroalkylalkoxylate (a nonionic surfactant, produced by Sumitomo-3M K.K. and marketed under trademark designation of "Fluorad FC-171"), and Potassium perfluoroalkylsulfonate (a nonionic surfactant, produced by Sumitomo-3M K.K. and marketed under trademark designation of "Fluorad FC-171").

This invention also allows use of an organic metal surfactant. The organic metal surfactants to be effectively used in this invention are those which contain such metals as Si, Ti, Sn, Zr, or Ge in the main chain or side chain of the molecular unit. The organic metal surfactant is preferred to have Si in the main chain of the molecular unit. It is particularly favorable to use a siloxane type surfactant.

As typical organic metal surfactants, those which are represented by the following formulas (1)–(19) [Yoshida, Kondo, Ogaki, and Yamanaka: "Surfactants, new edition," Kogakutosho (1966), page 34] may be cited.

  (1)

  (2)

  (3)

  (4)

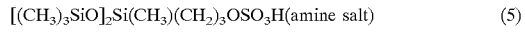  (5)

  (6)

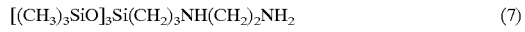  (7)

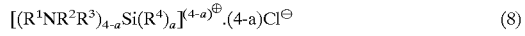  (8)

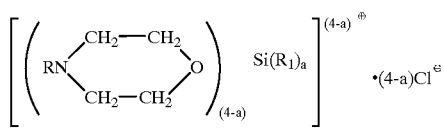  (9)

HO(C₂H₄C)₃SiC₂H₄COO(C₂H₄O)₃H  (10)

(CH₃)₃SiC₆H₄OC₂H₄OH  (11)

C₁₈H₃₇Si[O(C₂H₄O)ₙH]₃  (12)

(BuO)₃Ti[OTi(OBu)(OCOC₁₇H₃₅)]ₙOTi(OBu)₂  (13)

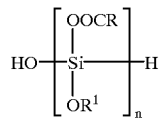  (14)

Si([O(CH₂CH₂)ₙOR]₄  (15)

[RO(CH₂CH₂O)ₙ]₂Ti(OC₄H₉)₂  (16)

[RO(CH₂CH₂O)ₙ]₂TiOOTi[(C₂H₄O)ₙOR]₂  (17)

[BuO(EO)n(PO)mCH₂CH(OH)CH₂OC₃H₆Si(CH₃)₂]₂O—[SiO(CH₃)₂]ₓ—  (18)

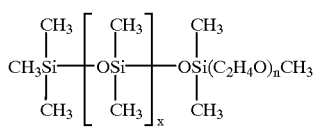  (19)

As the metal which is contained in the organic metal surfactants represented by the formulas (1)–(19) mentioned above, Sn, Zr, or Ge may be used in the place of Si or Ti.

The surfactant to be used in this invention does not need to be limited to the surfactants mentioned above.

The surfactant is used in an amount in the range of 0.0001–30 parts by weight, preferably 0.0003–5 parts by weight, based on the total amount of the water-soluble unsaturated monomer and the water-soluble cross-linking monomer. If this amount is less than 0.0001 part by weight, the added surfactant possibly fails to produce an amply effect in improving the water absorption speed. Conversely, if this amount exceeds 30 parts by weight, the excess is wasted without producing a proportionate addition to the expected effect and there is probability for leaking out the surfactant when water is absorbed and rather wet-back increases.

It has been heretofore known to use a surfactant in an aqueous solution polymerization. This known technique produces absolutely no improvement in the water absorption speed.

For this invention, it is essential that the monomer be polymerized in a state having bubbles dispersed therein. It has been heretofore known to remove dissolved oxygen from an aqueous monomer solution by means of an aspirator or an ejector. The prior art has been utterly ignorant of a method which comprises subjecting an aqueous monomer solution and a gas to fluid mixing and then polymerizing the monomer in a state having bubbles dispersed therein.

As typical examples of the gas to be subjected to the fluid mixing in conjunction with the aqueous monomer solution, such inert gases as nitrogen, argon, helium, and carbon dioxide may be cited. When the gas is used in the form of a mixture with oxygen and a sulfite such as sodium hydrogen sulfite is used as a polymerization initiator, the hydrophilic polymer to be produced is enabled to acquire a varying molecular weight by controlling the ratio of oxygen to the sulfite suitably. The gas may be used as mixed with sulfurous acid gas for the purpose of initiating the polymerization.

The viscosity of the aqueous monomer solution is not limited particularly. By adjusting this viscosity to a level exceeding 10 cP, the bubbles can be dispersed with improved stability. It is in the range of 10–100,000 cP, preferably 20–3000 cP. By setting the viscosity of the aqueous monomer solution at a level above 10 cP, the bubbles can be retained stably dispersed in the aqueous monomer solution for a long time. If the viscosity exceeds 100,000 cP, the bubbles in the aqueous monomer solution will possibly be so large as to render the production of a polymer having a high water absorption speed difficult.

The aqueous monomer solution, when necessary, may add a viscosity enhancer. This viscosity enhancer may be a hydrophilic polymer. As typical examples of the viscosity enhancer, polyacrylic acid (and salts thereof), polyvinyl alcohol, poly-vinyl pyrrolidone, polyacryl amide, polyethylene oxide, hydroxy-ethyl cellulose, carboxymethyl cellulose, and hydroxypropyl cellulose may be cited. Colloidal silica and cross-linked polyacrylic acid (and salts thereof) are also usable as the viscosity enhancer. The hydrophilic polymer which is utilized as the viscosity enhancer is preferred to have an average molecular weight of not less than 10,000, especially not less than 100,000. If the average molecular weight is less than 10,000, the amount of the viscosity enhancer to be added will be increased possibly to the extent of degrading the ability of the produced polymer to absorb water. The amount of the viscosity enhancer to be added is not particularly limited but is only required to heighten the viscosity of the aqueous monomer solution to a level exceeding 10 cP. Generally, this amount is in the range of 0.01–10% by weight, preferably 0.1–5% by weight, based on the amount of the water-soluble ethylenically unsaturated monomer mentioned above. If the amount of the viscosity enhancer to be added is less than 0.01% by weight, the viscosity will possibly fail to reach the level above 10 cP. If this amount exceeds 10% by weight, the excess will possibly degrade the ability to absorb water.

As a means to polymerize the monomer mentioned above, any of the known methods may be used. As typical examples of the method, aqueous solution polymerization and reversed-phase suspension polymerization may be cited. The polymerization, when necessary, may be implemented by exposing the monomer to radiation such as gamma ray, X-ray, or electron beam or to ultraviolet light in the presence of a polymerization initiator.

The method of this invention is effected by solving a water-soluble unsaturated monomer, a water-soluble cross-linking monomer, and a surfactant mentioned above in an aqueous medium thereby preparing an aqueous monomer solution, adding a polymerization initiator in a required amount to the aqueous monomer solution, and optionally heating the resultant mixture to a prescribed temperature thereby performing the aqueous solution polymerization.

Then, the polymer consequently obtained in the form of a hydrogel is optionally shredded and further dried and the resultant dry shreds are pulverized to obtain a water-absorbent resin capable of fast water absorption or a hydrophilic polymer in the form of powder.

The aqueous solution copolymerization of the water-soluble unsaturated monomer and the water-soluble cross-linking monomer may be performed by either of the method of continuous polymerization method and the method of batchwise polymerization under a decreased pressure, an increased pressure, or a normal pressure. The polymerization is preferred to proceed under the current of an inert gas such as nitrogen, helium, argon, or carbon dioxide.

In preparation for the aqueous solution copolymerization, the aqueous monomer solution is preferred to have a radical polymerization initiator solved or dispersed therein. As typical examples of the radical polymerization initiator, azo compounds such as 2,2'-azobis(2-amidinopropane) dihydrochloride; peroxides such as ammonium persulfate, potassium persulfate, sodium persulfate, hydrogen peroxide, benzoyl peroxide, cumene hydroperoxide, and di-t-butyl peroxide; and redox initiators obtained by combining the peroxides mentioned above with such reducing agents as sulfites, hydrogen sulfites, thiosulfates, formamidine sulfinic acid, and ascorbic acid may be cited. These radical polymerization initiators may be used either singly or in the form of a mixture of two or more members.

Among them, redox polymerization initiators are preferable. By using the redox polymerization initiators, the polymerization of the monomer carried out under the condition that bubbles are maintained without being broken. And the water-absorbent resin having fast absorption and high mechanical strength.

The amount of the radical polymerization initiator to be used is in the range of 0.001–5 parts by weight, preferably in the range of 0.01–1 part by weight, based on 100 parts by weight of the total amount of the water-soluble unsaturated monomer and the water-soluble cross-linking monomer, through variable with the combination of these monomers and the radical polymerization initiator. If the amount of the radical polymerization initiator to be used is less than 0.001 part by weight, the amount of the unaltered unsaturated monomer will increase and consequently the amount of the residual monomer in the produced water-absorbent resin will unduly increase. Conversely, if the amount of the radical polymerization initiator exceeds 5 parts by weight, the amount of the water-soluble component in the produced water-absorbent resin will unduly increase.

The temperature at the start of the polymerization, though variable with the kind of the radical polymerization initiator to be used, is preferred to be in the range of 0°–50° C., especially in the range of 10°–40° C. The polymerization temperature in the process of reaction, though variable with the kind of the radical polymerization initiator to be used, is preferred to be in the range of 20°–110° C., especially in the range of 30°–90° C. If the temperature at the start of the polymerization or the polymerization temperature in the process of reaction deviates from the range mentioned above, such disadvantages as (1) an undue increase in the amount of the residual monomer in the produced water-absorbent resin, (b) difficulty incurred in the control of the foaming with a foaming agent which will be described specifically herein below, and (c) excessive advance of the self-crosslinking reaction accompanied by an undue decrease in the amount of water absorbed by the water-absorbent resin will possibly ensue.

The reaction time is not particularly limited but is only required to be set depending on the combination of an unsaturated monomer, a cross-linking agent, and a radical polymerization initiator or on such reaction conditions as the reaction temperature.

It is essential that the aqueous solution copolymerization of the monomer contemplated by this invention be performed in the state having the bubbles of an inert gas dispersed in the aqueous monomer solution. The volume of the aqueous monomer solution which has the bubbles of the inert gas dispersed therein is 1.02–5 times, preferably 1.08–4 times, more preferably 1.11–3 times, and most preferably 1.2–2.5 times, the volume of the aqueous monomer solution having no bubble of the inert gas dispersed therein.

In the conventional operation of polymerization reaction performed in a stirred state, bubbles may possibly enter more or less into the polymerization system. The inventors, however, have confirmed that even when such bubbles find their way more or less into the polymerization under in an ordinary operation, the change in volume does not reach 1.01 times the original volume. Any change in volume exceeding 1.02 times the original volume results from the operation of an intentional introduction of bubbles into the polymerization system. This operation is recognized to improve the quality of the produced resin. Since the change in volume of the aqueous cross-linking monomer solution in the reaction vessel manifests itself in the change of the height of the surface of the solution, the ratio of the change in volume can be easily confirmed. Further, since the transparency of the aqueous solution is lowered in consequence of the operation of intentional introduction of bubbles, the state of dispersion of bubbles in the aqueous solution can be visually confirmed.

If the volume of the aqueous monomer solution wherein the inert gas bubbles are dispersed exceeds 5 times, diameter of the dispersed bubbles in the system becomes larger, so the water-absorbent resin thus obtained becomes brittle.

As means to disperse the bubbles of an inert gas in the aqueous monomer solution, a method which resides in introducing the inert gas into the aqueous solution, a method which resides in subjecting the aqueous solution to a fast intense stirring, a method which resides in preparatorily adding a foaming agent to the aqueous solution, and a method which combines at least two of these methods are available. For the method resorting to the fast intense stirring, the intense stirring by the use of a stirrer or stirring vanes or the intense stirring by the use of a high-speed homogenizer or an ultrasonic homogenizer is available.

According to the present invention, it is preferable to disperse the inert gas bubbles so that the average diameter of the inert gas bubbles dispersed in the aqueous monomer solution is in the range of 10 to 500 $\mu$m, preferably 50 to 200 $\mu$m. If the diameter is less than 10 $\mu$m, there is possibility that the water-absorbent resin thus obtained is low in water absorption rate, and if the diameter exceeds 500 $\mu$m, the water-absorbent resin becomes sometimes low in water absorption rate and brittle in mechanical strength.

The aqueous solution polymerization contemplated by this invention can be carried out while the produced copolymer is foamed continuously. For example, a method which obtains an extremely absorbent polymer by preparing a solution containing a carboxylic acid monomer or a water-soluble salt thereof and a cross-linking agent, adding to this solution a carbonate type foaming agent and a polymerization initiator thereby forming a carbonated monomer solution, polymerizing this carbonated monomer solution thereby forming a microporous hydrogel, pulverizing and drying the microporous hydrogel, and subjecting the dry pulverized hydrogel to a surface-treatment with a cross-linking agent (JP-A-05-237,378 and JP-A-07-185,331), a method which produces a microporous water-absorbent resin by polymerizing a water-soluble monomer in the presence of the dispersion of such a volatile organic compound as toluene (U.S. Pat. No. 5,354,290), a method which produces an extremely absorbent resin by dispersing a water-insoluble foaming agent with the aid of a surfactant in a reaction mixture consisting of a water-soluble monomer, a cross-linking agent, and a water-soluble solvent, then foaming the resultant mixture, and further causing the monomer to react with the cross-linking agent (U.S. Pat. No. 5,338,766), a method which produces an extremely absorbent water-absorbent resin by copolymerizing a water-soluble monomer and a cross-linking agent by the use of an azo initiator having a 10 hours' half-life in the range of 30°–120° C. (WO95/17455), and a method which obtains a water-absorbent resin by copolymerizing a water-soluble monomer and a cross-linking agent in the presence of a foaming agent formed of an acrylic acid salt complex of an azo compound (WO96/17884) may be adopted.

The foaming is implemented by either introducing an inert gas such as, for example, nitrogen, carbon dioxide, or air into the aqueous solution or subjecting the aqueous solution to fast intense stirring. The foaming is otherwise attained by adding a foaming agent to the aqueous solution prior to the polymerization.

As typical examples of the foaming agent, carbonates such as sodium carbonate, potassium carbonate, ammonium carbonate, magnesium carbonate, calcium carbonate, sodium hydrogen carbonate, potassium hydrogen carbonate, ammonium hydrogen carbonate, magnesium hydrogen carbonate, calcium hydrogen carbonate, zinc carbonate, and barium carbonate, water-soluble azo polymerization initiators such as azobisamidinopropane dichloride, dicarboxylic acids such as malonic acid, and volatile organic solvents such as trichloroethane and trifluoroethane may be cited. When the foaming agent is added, the amount of this foaming agent to be used is in the range of 0–5 parts by weight, preferably 0–1 part by weight, based on the total amount of the water-soluble unsaturated monomer and the water-soluble cross-linking monomer or on 100 parts by weight of the water-soluble ethylenically unsaturated monomer.

The hydrogel containing the bubbles mentioned above, when necessary, is disintegrated either during the reaction or after completion of the reaction by a stated method into fragments measuring in the approximate range of 0.1 mm–50 mm, preferably 1 mm–20 mm. Then, the hydrogel containing the bubbles is dried to be foamed more efficiently. Incidentally, the foaming with a foaming agent may be carried out during the drying and not during the reaction.

The drying temperature is not particularly limited but is required to fall in the range of 100°–250° C., preferably in the range of 120°–200° C., for example. Though the drying time is not particularly limited, it is preferred to be in the approximate range of 10 seconds–5 hours. The hydrogel resin may be neutralized or further disintegrated for fine division prior to the drying.

The drying method to be adopted is not particularly limited but may be selected from among various methods such as, for example, drying by heating, drying with hot air, drying under a reduced pressure, drying with an infrared ray, drying with a microwave, drying in a drum drier, dehydration by azeotropy with a hydrophobic organic solvent, and a high-humidity drying by the use of hot steam. Among the methods of drying mentioned above, the drying with hot air and the drying with a microwave prove particularly favorable. When the hydrogel containing the bubbles is irradiated with a microwave, the produced water-absorbent resin enjoys a further exalted water absorption speed because the bubbles are consequently expanded to several to some tens of times the original volume.

When the hydrogel containing the bubbles is dried with a microwave, the thickness of the fragments of the hydrogel is preferably not less than 3 mm, more preferably not less than 5 mm, and still more preferably not less than 10 mm. When the hydrogel is dried with a microwave, it is particularly preferred to be molded in the form of a sheet having the thickness mentioned above.

By the polymerization mentioned above, namely by the method of production mentioned above, the water-absorbent resin capable of fast water absorption or the hydrophilic polymer can be obtained inexpensively and easily. The average pore diameter of the water-absorbent resin or the hydrophilic polymer which has almost independent bubble structure is in the range of 10–500 $\mu$m, preferably in the range of 20–400 $\mu$m, more preferably in the range of 30–300 $\mu$m, and most preferably in the range of 40–200 $\mu$m. The pore diameter mentioned above is found by subjecting the cross section of the water-absorbent resin or the hydrophilic polymer in a dry state to image analysis with the aid of an electron microscope. Specifically, the average pore diameter is obtained by forming a histogram representing the distribution of pore diameters of the water-absorbent resin in consequence of the image analysis and calculating the number average of pore diameters based on the histogram.

The water-absorbent resin or the hydrophilic polymer which has been obtained by the method described above assumes a porous texture containing numerous pores in the interior and on the surface thereof and, therefore, amply secures empty spaces necessary for the migration of the aqueous liquid into the water-absorbent resin or the hydrophilic polymer. It, therefore, excels in the ability to pass or diffuse the aqueous liquid and can improve the water absorption speed and the water-retaining property by virtue of capillary. Since the water-absorbent resin or the hydrophilic polymer of this invention assumes a porous texture, even when it is produced in the form of particles, it can retain the ability to pass the aqueous liquid during the passage of the liquid between the particles. If the average pore diameter mentioned above is smaller than 10 $\mu$m, the resin or the polymer may possibly be deficient in the ability to pass the aqueous liquid or in the diffusing property. Conversely, if the average pore diameter is larger than 500 $\mu$m, the improvement in the water-absorbent speed will possibly be insufficient.

The water-absorbent resin or the hydrophilic polymer may be treated with the surface cross-linking agent and allowed to form a covalent bond (secondary cross-linkage) and consequently enabled to have the cross-link density in the surface region thereof further exalted. The surface cross-linking agent is not particularly limited but is only required to be a compound containing a plurality of functional groups capable of reacting with the carboxyl group contained in the water-absorbent resin and consequently forming the covalent bond. By treating the water-absorbent resin or the hydrophilic polymer with the surface cross-linking agent, the water-absorbent resin is further improved in the ability to pass liquid, the water absorption speed, the capacity for absorbing water, and the ability to pass liquid under load.

As typical examples of the surface cross-linking agent, polyhydric alcohol compounds such as ethylene glycol, diethylene glycol, propylene glycol, triethylene glycol, tetraethylene glycol, polyethylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,5-pentanediol, 1,6-hexanediol, 1,2-cyclohexane dimethanol, 1,2-cyclohexanediol, trimethylolpropane, diethanolamine, triethanolamine, polyoxypropylene, oxyethylene-oxypropylene block copolymer, pentaerythritol, and sorbitol; epoxy compounds such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether, and glycidol; polyamine compounds such as ethylenediamine, diethylenetriamine, triethylenetetramine, tetraethylenepentamine, pentaethylenehexamine, polyethyleneimine, and polyamide; haloepoxy compounds such as epichlorohydrin, epibromohydrin, and α-methyl epichlorohydrin; condensates of the polyamine compounds with the haloepoxy compounds; polyisocyanate compounds such as 2,4-tolylene diisocyanate and hexamethylene diisocyanate; polyoxazoline compounds such as 1,2-ethylene-bis-oxazoline; and silane coupling agents such as γ-glycidoxypropyl trimethoxy silane and -γ-aminopropyl trimethoxy silane; and alkylene carbonate compounds such as 1,3-dioxolan-2-on, 4-methyl-1,3-dioxolan-2-on, 4,5-dimethyl-1,3-dioxolan-2-on, 4,4-dimethyl-1,3-dioxolan-2-on, 4-ethyl-1,3-dioxolan-2-on, 4-hydroxymethyl-1,3-dioxolan-2-on, 2,3-dioxan-2-on, 4-methyl-1,4-dioxan-2-on, 4,6-dimethyl-1,3-dioxan-2-on, and 1,3-dioxoban-2-on may be cited. These are not particularly exclusive examples.

Among other surface cross-linking agents cited above, polyhydric alcohol compounds, epoxy compounds, polyamine compounds, the condensates of polyamine compounds with haloepoxy compounds, and alkylene carbonate compounds prove particularly advantageous.

These surface cross-linking agents may be used either singly or in the form of a mixture of two or more members. When two or more species of surface cross-linking agents are used in combination, the produced water-absorbent resin or hydrophilic polymer is enabled to acquire further improved water absorption properties by combining a first surface cross-linking agent and a second surface cross-linking agent which have mutually different solubility parameters (SP values). The expression "solubility parameter" given above refers to the numerical value which is generally used as a factor expressing the property of width of a compound.

The first surface cross-linking agent mentioned above is a compound such as, for example, glycerol which can react with the carboxyl group contained in the water-absorbent resin or the hydrophilic polymer and has a solubility parameter of not less than 12.5 $(cal/cm^3)^{1/2}$. The second surface cross-linking agent mentioned above is a compound such as, for example, ethylene glycol diglycidyl ether which can react with the carboxyl group contained in the water-absorbent resin or the hydrophilic polymer and has a solubility parameter of less than 12.5 $(cal/cm^3)^{1/2}$.

The amount of the surface cross-linking agent to be used, though variable with the combination of the water-absorbent resin or the hydrophilic polymer and the surface cross-linking agent, is in the range of 0.01–5 parts by weight, preferably in the range of 0.05–3 parts by weight, based on 100 parts by weight of the water-absorbent resin or the hydrophilic polymer in a dry state. By using the surface cross-linking agent in an amount in the range specified above, the absorption property to be manifested to such humors (aqueous liquids) as urine, sweat, and menses is further improved. If the amount of the surface cross-linking agent to be used is less than 0.01 part by weight, the cross-link density in the surface region of the water-absorbent resin or the hydrophilic polymer will be hardly improved. If this amount exceeds 5 parts by weight, the excess will prove uneconomical and possibly render difficult the control of the cross-link density at a proper value.

The method for treating the water-absorbent resin or the hydrophilic polymer with the surface cross-linking agent is not particularly limited. As typical examples of the method which is effectively used for this purpose, (1) a method which comprises mixing the water-absorbent resin or the hydrophilic polymer with the surface cross-linking agent in the absence of a solvent, (2) a method which comprises dispersing the water-absorbent resin or the hydrophilic polymer in a hydrophobic solvent such as cyclohexane or pentane and then mixing the resultant dispersion with the surface cross-linking agent, and (3) a method which comprises solving or dispersing the surface cross-linking agent in a hydrophilic solvent and then mixing the resultant solution or dispersion with the water-absorbent resin or the hydrophilic polymer by spraying or dropwise addition may be cited. The hydrophilic solvent mentioned above is preferred to be water or a mixture of water with an organic solvent soluble in water.

As typical examples of the organic solvent mentioned above, lower alcohols such as methyl alcohol, ethyl alcohol, n-propyl alcohol, iso-propyl alcohol, n-butyl alcohol, iso-butyl alcohol, and t-butyl alcohol, ketones such as acetone, ethers such as dioxane, ethylene oxide (EO) adduct of monohydric alcohol, and tetrahydrofuran; amides such as N,N-dimethyl formamide and ε-caprolactam; and sulfoxides such as dimethyl sulfoxide may be cited. These organic solvents may be used either singly or in the form of a mixture of two or more members.

The amount of the hydrophilic solvent to be used for the water-absorbent resin and the surface cross-linking agent, though variable with the combination of the water-absorbent resin or the hydrophilic polymer, the surface cross-linking agent, and the hydrophilic solvent, is not more than 200 parts by weight, preferably in the range of 0.001–50 parts by weight, more preferably in the range of 0.1–50 parts by weight, and especially preferably in the range of 0.5–20 parts by weight, based on 100 parts by weight of the water-absorbent resin.

The secondary cross-linkage with the surface cross-linking agent is implemented by optionally heat-treating the surface cross-linking agent, depending on the kind of the surface cross-linking agent, and consequently cross-linking the surface region of the water-absorbent resin or the hydrophilic polymer. By performing the secondary cross-linkage mentioned above, the produced water-absorbent resin or the hydrophilic polymer is enabled to manifest a further heightened ratio of cubic expansion by water absorption under pressure.

The mixing device to be used in mixing the water-absorbent resin or the hydrophilic polymer with the surface cross-linking agent is preferred to be endowed with a large mixing power enough to ensure homogeneous mixture thereof. As preferred typical examples of the mixing device mentioned above, cylindrical mixing device, double-wall conical mixing device, high-speed stirring type mixing device, V-shaped mixing device, ribbon type mixing device, screw type mixing device, fluid furnace type rotary disc mixing device, air current type mixing device, twin-arm kneader, internal mixing device, pulverizing type kneader, rotary mixing device, and screw type extruder may be cited.

The temperature and the time for the treatment of the water-absorbent resin or the hydrophilic polymer with the surface cross-linking agent are not particularly limited but are only required to be suitable selected and set depending on the combination of the water-absorbent resin or the hydrophilic polymer with the surface cross-linking agent and the expected cross-link density. The temperature of treatment, for example, is preferred to be in the range of 0°–250° C.

In this invention, surface of the water-absorbent resin particles can be cross-linked by a specific method. When the water-absorbent resin particles are irregular disintegrated fragments, surface of the water-absorbent resin of this invention can be cross-linked by the following steps.

(1) A step of mixing the water-absorbent resin particles with a surface cross-linking agent containing at least two groups capable of reacting with the functional group contained in the water-absorbent resin particles.

(2) A step of mixing the resultant mixture of the water-absorbent resin particles and the surface cross-linking agent with an aqueous liquid.

(3) A step of causing the water-absorbent resin particles to react with the surface cross-linking agent.

It can be alternatively further subjected the water-absorbent resin resulting from the surface treatment to another surface treatment, by adding a surface-treating agent to the water-absorbent resin particles and meanwhile thoroughly loosing the particles, or by thoroughly loosing and heating the particles while the particles are undergoing the surface treatment. It can be otherwise subjected a surface-treating agent to the particles while controlling the temperature of the particles in the range of 20°–80° C., preferably in the range of 30°–60° C. and subsequently surface-treating the particles. If the temperature of the particles deviates from the range specified above, the particles intended to be mixed with the surface-treating agent will tend to agglomerate and, as a result, the produced water-absorbent resin will possibly exhibit an unduly low ratio of cubic expansion due to water absorption under a load. The above-mentioned surface treatment method can be applied to not only the porous water-absorbent resin but also to various water-absorbent resin. The above-mentioned surface treating method may be applied not only to the porous water-absorbent resin but also to various water-absorbent resin.

The water-absorbent resin particles described above are required to form a hydrogel in water by absorbing a large volume of water and to contain a carboxyl group. As typical examples of the water-absorbent resin particles that answer the description given above, cross-linked partially neutralized polyacrylic acid, hydrolyzed starch-acrylonitrile graft polymer, hydrolyzed starch-acrylic acid graft polymer, saponified vinyl acetate-acrylic ester copolymer, hydrolyzed acrylonitrile copolymer or acrylamide copolymer or the cross-linked derivative of the hydrolyzate, modified carboxyl group-containing cross-linked polyvinyl alcohol, and cross-linked isobutylene-maleic anhydride copolymer may be cited.

The water-absorbent resin particles of the description given above is generally obtained by polymerizing a monomer component essentially containing an unsaturated carboxylic acid such as, for example, at least one member selected from the group consisting of acrylic acid, methacrylic acid, maleic acid, maleic anhydride, fumaric acid, crotonic acid, itaconic acid, β-hydroxy-acrylic acid, β-acryloxy propionic acid, and the neutralized products thereof. Among other monomer components mentioned above, acrylic acid, methacrylic acid, and the neutralization products thereof prove particularly favorable.

The water-absorbent resin particles which can be used in this invention, when necessary, may be polymerized by using other monomer in combination with the unsaturated carboxylic acid mentioned above.

The amount of the carboxyl group contained in the water-absorbent resin particles is not particularly limited but is preferred to be not less than 0.01 equivalent weight per 100 g of the water-absorbent resin particles. The ratio of the unneutralized portion of the polyacrylic acid, for example, is preferred to be in the range of 1–60 mol %, preferably in the range of 10–50 mol %.

The water-absorbent resin particles are preferred to be those obtained as specifically described above by copolymerizing or reacting a very small amount of an internal cross-linking agent containing at least two polymerizing unsaturated groups or at least two reactive groups rather than those of the self-crosslinking type having no use for a cross-linking agent.

When the monomer mentioned above is polymerized for the purpose of obtaining the water-absorbent resin particles of this invention, bulk polymerization or precipitation polymerization may be adopted. On account of the quality of the product and the ease of control of the polymerization, the monomer is preferred to be prepared in the form of an aqueous solution and subjected as such to aqueous solution polymerization or reversed-phase suspension polymerization.

The water-absorbent resin particles which are obtained by the method of polymerization described above and advantageously used for this invention have various shapes such as irregular fractures, beads, fibers, rods, rough spheres, and scales.

The average particle diameter of the water-absorbent resin particles to be used in this invention is preferred to be in the range of 50–200 $\mu$m, especially in the range of 75–180 $\mu$m. If the average particle diameter is smaller than 50 $\mu$m, the cross-linkage will proceed excessively because of the secondary cross-linking resulting from the surface treatment and the produced water-absorbent resin will suffer from an unduly low ratio of cubic expansion due to water absorption. Conversely, if the average particle diameter exceeds 200 $\mu$m, the produced water-absorbent resin will be deficient in water absorption speed.

The water-absorbent resin particles of this quality have a size such that they pass a U.S. standard 70-mesh sieve having openings of 212 $\mu$m and stop on a U.S. standard 325-mesh sieve having openings of 45 $\mu$m.

This invention aims to provide a water-absorbent resin having an average particle diameter in the range of 50–200 $\mu$m and a ratio of cubic expansion by water absorption of at least 35 g/g under load. The water-absorbent resin of this description is obtained, for example, by mixing water-absorbent resin particles with a cross-linking agent containing at least two groups capable of reacting with the functional group contained in the water-absorbent resin, then mixing the mixture of the water-absorbent resin particles and the cross-linking agent with an aqueous liquid, and subsequently causing the water-absorbent resin to react with the cross-linking agent.

The water-absorbent resin or the hydrophilic polymer mentioned above, when necessary, may further incorporate therein deodorant, perfume, various inorganic powders, foaming agent, pigment, dye, hydrophilic short fibers, plasticizer, adhesive agent, surfactant, fertilizer, oxidizing agent, reducing agent, water, or salts and derive various functions therefrom.

The inorganic powders are substances which are inactive to the aqueous liquid. As typical examples of the inorganic powders, minute particles of various inorganic compounds and minute particles of clayish minerals may be cited. The inorganic powder is preferred to manifest proper affinity for water and insolubility or sparing solubility in water. As typical examples of the inorganic powder, metal oxides such as silicon dioxide and titanium dioxide, silicic acid (and salts thereof) such as natural zeolite and synthetic zeolite, kaolin, talc, clay, and bentonite may be cited. Among other inorganic powders mentioned above, silicon dioxide and silicic acid (and salts thereof) prove particularly advantageous. The species of silicon dioxide and silicic acid (and salts thereof) which have an average particle diameter of not more than 200 $\mu$m as determined by the coal tar counter method prove especially favorable.

The amount of the inorganic powder to be used for the water-absorbent resin or the hydrophilic powder, though variable with the combination of the water-absorbent resin and the inorganic powder, is only required to be in the range of 0.001–10 parts by weight, preferably in the range of 0.01–5 parts by weight, based on 100 parts by weight of the water-absorbent resin. The method for mixing the water-absorbent resin and the inorganic powder is not particularly limited. Specifically, a dry blend method, a wet mixing method, etc. may be adopted therefor. Among these methods, the dry blend method proves particularly advantageous.

The water-absorbent resin or the hydrophilic polymer is combined with a fibrous material such as, for example, pulp to produce an absorbent article.

As typical examples of the absorbent article, hygienic materials (humor absorbing articles) such as disposable diapers, sanitary napkins, pads intended for patients of incontinence, protecting materials for lacerations, and curing materials for lacerations; absorbent articles for urines from pet animals; materials for civil engineering and construction such as water-retaining materials for building materials and soil, water-blocking materials, packing materials, and gel water bags; good grade articles such as drip-absorbing materials, freshness-retaining materials, and refrigerating materials; industrial grade articles such as oil-water separating materials, frost preventing materials, and coagulants; and agricultural and horticultural articles such as water-retaining materials for plants and soil may be cited. These are not exclusive examples. The disposable diaper, for example, is formed by sequentially superposing a back sheet (rear facing material) made of a liquid-impervious substance, the water-absorbent resin composition mentioned above, and a top sheet (front facing material) made of a liquid-permeable substance in the order mentioned and fastening them mutually and attaching a gather (elastic part) and a so-called tape fastener to the resultant laminate. The disposable diapers embrace combination diapers and pants which are used in giving toilet training to infants.

The water-absorbent resin which is obtained as described above has a capacity for water absorption in the range of 10–100 g/g, preferably 20–80 g/g. Further, a specific surface area of the water-absorbent resin is in the range of 0.02 to 1.0 m$^2$/g, preferably 0.025 to 0.5 m$^2$/g.

Now, this invention will be described more specifically below with reference to working examples and controls. It should be noted, however, that this invention is not limited by these examples. As used in the working examples and the controls, the term "%" means "% by weight" and the term "parts" means "parts by weight" unless otherwise specified.

The capacity for water absorption, the water absorption speed, and the water-soluble content of the water-absorbent resin are determined by the following methods.

(1) Capacity for Water Absorption of Water-absorbent Resin

A pouch resembling a tea bag (6 cm×6 cm) was uniformly packed with 0.2 g of a sample water-absorbent resin, closed by heat sealing the opening thereof, and then immersed in an aqueous 0.9% sodium chloride solution (physiological saline solution) or an artificial urine. After 60 minutes standing in the solution, the pouch was extracted from the solution, drained by the use of a centrifugal separator at 250 G for 3 minutes, and weighed. Let $W_1$ (g) stand for the weight thus found. The same procedure was repeated on the pouch containing no water-absorbent resin sample. Let $W_0$ (g) stand for the weight consequently found. The capacity (g/g) of the sample for absorbing water was calculated in accordance with the following formula, using the weights, $W_1$ and $W_0$.

Capacity (g/g)=($W_1$−$W_0$)/Weight (g) of water-absorbent resin

The composition of the artificial urine and the ratios of the components used therein were as shown below.

| Composition of artificial urine | Ratios of components (% by weight) |
|---|---|
| Sodium sulfate | 0.200% |
| Potassium chloride | 0.200% |
| Magnesium chloride hexahydrate | 0.050% |
| Calcium chloride dihydrate | 0.025% |
| Ammonium dihydrogen phosphate | 0.035% |
| Diammonium hydrogen phosphate | 0.015% |

(2) Water Absorption Speed of Water-absorbent Resin

In a bottomed cylindrical cup of polypropylene, 50 mm in inside diameter and 70 mm in height, 1.0 g of a water-absorbent resin sample (obtained in advance by separating a portion of resin having particle diameters in the range of 600 $\mu$m–300 $\mu$m with sieves) was placed. Then, 28 g of the aqueous physiological saline solution was poured into the cup. Then, the interval between the time the aqueous physiological saline solution was pored and the time the aqueous physiological saline solution was wholly absorbed by the sample and erased from sight was clocked. This measurement was repeated three times and the average of the results of repeated measurements was registered as absorption speed (seconds).

(3) Content of Water-soluble Component in Water-absorbent Resin

In 1000 ml of deionized water, 0.5 g of a water-absorbent resin sample was dispersed and stirred for 16 hours. The dispersion was passed through a filter paper. Then, the filtrate was assayed by colloid titration to determine the content (%) of water-soluble component in the sample.

(4) Average Particle Diameter of Water-absorbent Resin

The average particle diameter of a water-absorbent resin sample was determined by classifying the sample with sieves having meshes (850 $\mu$m, 600 $\mu$m, 300 $\mu$m, 150 $\mu$m, and 106 $\mu$m) shown below, plotting the residual percentage points R on a logarithmic probability chart, and finding a particle diameter equivalent to R=50%, and registering the found particle diameter.

(5) Average Pore Diameter of Dispersed Inert Gas

The average pore diameter was measured by slicing the hydrated gel-like polymer, measuring Feret diameter by a photomicroscope, preparing a histogram which shows distributions of pore distributions of the bubbles, and calculating the number diameter from the histogram.

(6) Measurement of Specific Surface Area

In the present invention, a specific surface area of the water-absorbent resin was measured by B.E.T. one point method. As the measuring device, analyte automatic specific surface area measuring device U-1 (product of Yuasa Ionics Kabushiki Kaisha) was used. First, about 5 g of the water-absorbent resin (the sample was prepared by dispersing the particle diameter portion having 600–300 µm by sieve) was changed into about 13 cm$^3$ of microcapsul (TYPE:QS-400), the sample-containing microcapsul was heated to 150° C. under circumstance of nitrogen gas and the sample was degassed and dehydrated sufficiently. Then the sample-containing microcapsul was cooled to −200° C. under circumstance of a mixed gas of helium and 0.1% of kripton gas and the mixed gas was absorbed into the sample until reaching equilibrium. Then a temperature of sample-containing microcapsul was heated to a room temperature, the mixed gas was removed from the sample, and then a specific surface area of the water-absorbent resin was determined by a removed amount of the kripton mixed gas. Absorption-desorption process of the sample-containing microcapsul was repeated for three times to determine the specific surface area of the water-absorbent resin by the average thereof.

(7) Ratio of Cubic Expansion with Absorbed Water Under Load

The ratio of cubic expansion of a given sample with absorbed water under load was determined by the use of a measuring device exhibited in FIG. 6. The measuring device was composed, as illustrated in FIG. 6, of a balance 11, a container 12 of a prescribed inner volume mounted on the balance 11, an ambient air suction pipe seat 13, a conduit 14, a glass filter 16, and a measuring part 15 mounted on the glass filter 16. The container 12 is provided on the top thereof with an opening part 12a and on the lateral part thereof with an opening part 12b. The ambient air suction pipe 13 is inserted into the opening part 12a and the conduit 14 is fitted into the opening part 12b. The container 12 holds a prescribed amount of an artificial urine 22. The lower end part of the ambient air suction pipe 13 is immersed in the artificial urine 22. The ambient air suction pipe 13 is provided for the purpose of keeping the internal pressure of the container 12 substantially at the atmospheric pressure. The glass filter 16 mentioned above is formed in a diameter of 55 mm. The container 12 and the glass filter 16 communicate with each other through the medium of the conduit 14 which is made of silicone resin. The glass filter 16 has the position and height thereof fixed relative to the container 12. The measuring part 15 mentioned above is provided with a filter paper 17, a supporting cylinder 19, a metal net 20 attached to the bottom of the supporting cylinder 19, and a weight 21. The measuring part 15 has the filter paper 17 and the supporting cylinder 19 (and consequently the metal net 10) sequentially mounted on the glass filter 16 in the order mentioned. The metal net 20 is made of stainless steel and has a 400-mesh size. The upper face of the metal net 20, namely the contact face of the metal net 20 and a water-absorbent resin 25, is set flush with the height of a lower end face 13a of the ambient air suction pipe 13. On the metal net 20, a prescribed amount of the water-absorbent resin is uniformly scattered. The weight 21 and the metal net 20 have their weights adjusted so that a load of 0.7 psi is evenly exerted on the water-absorbent resin 25.

The capacity of a given sample for absorbing water under load was determined by the use of the measuring device constructed as described above. The method for implementing the determination will be described below.

The artificial urine 22 in a prescribed amount was placed in the container 12, The container 12 was prepared as prescribed for the determination as by fitting the ambient air suction pipe 13 in the container. Then, the filter paper 17 was mounted on the glass filter 16. Parallelly with this mounting, 0.9 g of the water-absorbent resin was evenly scattered in the supporting cylinder 19, namely on the metal net 20 and the weight 21 was placed on the layer of the water-absorbent resin 25. Then, on the filter paper 17, the metal net 20, namely the supporting cylinder 19 having the water-absorbent resin 25 and the weight 21 mounted thereon was mounted in such a manner that the central part thereof would coincide with the central part of the glass filter 16. Subsequently, along the course of time over 60 minutes following the time at which the supporting cylinder 19 was mounted on the filter paper 17, the amount of the artificial urine absorbed by the water-absorbent resin 265 was found from the scale reading of the balance 11. The same procedure was repeated without using the water-absorbent resin 25 to find the weight of the artificial urine absorbed by the filter paper 17, for example, other than the water-absorbent resin, from the scale reading of the balance 11. This weight was registered as a blank value. The capacity of the sample for water absorption under load was found in accordance with the following formula.

Capacity for water absorption under load (g/g)=(Amount of water absorbed—Blank value after the elapse of 60 minutes)/Weight of the water-absorbent resin

EXAMPLE 1

An aqueous monomer solution containing 153 parts of acrylic acid, 1615 parts of 37% sodium acrylate, 4.9 parts of poly-ethylene glycol (n=8) diacrylate, 0.75 part of a fluorine based cationic surfactant (produced by Sumitomo-3M K.K. and marketed under trademark designation of "Fluorad FC-135"), and 710 parts of deionized water was prepared. This aqueous solution was intensely stirred fast under a current of nitrogen to displace the dissolved oxygen in the aqueous solution with nitrogen and disperse a large volume of nitrogen bubbles in the aqueous monomer solution. When the nitrogen gas was uniformly dispersed in the aqueous monomer solution and the volume of the solution was consequently increased to 1.58 times the original volume, 10 parts of an aqueous 10% sodium persulfate solution and 10 parts of an aqueous 5% sodium hydrogen sulfite solution were added to the resultant dispersion under fast intense stirring to start polymerization immediately. The stationary polymerization was left proceeding for 2 hours at a temperature in the range of 25°–75° C. with the bubbles in a dispersed state. The spongy hydrogel polymer resulting from the polymerization and containing bubbles copiously was cut into cubes of 10 mm to 50 mm and then dried in a hot air drier at 150° C. for 1 hour. Average pore diameter of bubbles in the hydrate gel polymer was 90 µm. The dried cubes of hydrogel polymer were pulverized with a pulverizer and the polymer particles that passed a sieve having meshes of 850 µm were separated to obtain a water-absorbent resin (1), 220 µm in average particle diameter, of this invention. The capacity for water absorption, the water absorption speed, and the content of water-soluble component of the water-absorbent resin (1) of this invention were respectively 31.1 g/g, 26 seconds, and 5.5%. Average pore diameter of the surface was 85 µm.

EXAMPLE 2

An aqueous monomer solution containing 153 parts of acrylic acid, 1615 parts of 37% sodium acrylate, 4.9 parts of poly-ethylene glycol (n=8) diacrylate, 1.5 parts of a lauryl betaine based surfactant (produced by Kao Soap Co., Ltd.

and marketed under trademark designation of "Anhitol 20BS"), and 710 parts of deionized water was prepared. This aqueous solution was intensely stirred fast under a current of nitrogen to displace the dissolved oxygen in the aqueous solution with nitrogen and disperse a large volume of nitrogen bubbles in the aqueous monomer solution. When the nitrogen gas was uniformly dispersed in the aqueous monomer solution and the volume of the solution was consequently increased to 1.20 times the original volume, 10 parts of an aqueous 10% sodium persulfate solution and 10 parts of an aqueous 10% sodium hydrogen sulfite solution were added to the resultant dispersion under fast intense stirring to start polymerization immediately. The stationary polymerization was left proceeding for 1 hour at a temperature in the range of 25°–75° C. with the bubbles in a dispersed state. The hydrogel polymer resulting from the polymerization and containing bubbles was cut into cubes of 5 mm and then dried in a hot air drier at 150° C. for one hour. Average pore diameter of bubbles in the hydrated gel polymer was 200 μm. The dried cubes of hydrogel polymer were pulverized with a pulverizer and the polymer particles that passed a sieve having meshes of 850 μm were separated to obtain a water-absorbent resin (2), 400 μm in average particle diameter, of this invention. The capacity for water absorption, the water absorption speed, and the content of water-soluble component of the water-absorbent resin (2) of this invention were respectively 38.7 g/g, 50 seconds, and 6.6%.

EXAMPLE 3

An aqueous monomer solution containing 153 parts of acrylic acid, 1615 parts of 37% sodium acrylate, 4.9 parts of poly-ethylene glycol (n=8) diacrylate, 0.75 part of a fluorine based cationic surfactant (produced by Sumitomo-3M K.K. and marketed under trademark designation of "Fluorad FC-135"), and 710 parts of deionied water was prepared. This aqueous solution was intensely stirred fast under a current of nitrogen to displace the dissolved oxygen in the aqueous solution with nitrogen and disperse a large volume of nitrogen bubbles in the aqueous monomer solution. When the nitrogen gas was uniformly dispersed in the aqueous monomer solution and the volume of the solution was consequently increased to 1.20 times the original volume, 10 parts of an aqueous 10% sodium persulfate solution and 10 parts of an aqueous 10% sodium hydrogen sulfite solution were added to the resultant dispersion under fast intense stirring to start polymerization immediately. The stationary polymerization was left proceeding for 3 hours at a temperature in the range of 25°–75° C. with the bubbles in a dispersed state. The hydrogel polymer resulting from the polymerization and containing bubbles was cut into cubes of 5 mm and then dried in a hot air drier at 150° C. for one hour. Average pore diameter of bubbles in the hydrated gel polymer was 130 μm. The dried cubes of hydrogel polymer were pulverized with a pulverizer and the polymer particles that passed a sieve having meshes of 850 μm were separated to obtain a water-absorbent resin (3), 320 μm in average particle diameter, of this invention. The capacity for water absorption, the water absorption speed, and the content of water-soluble component of the water-absorbent resin (1) of this invention were respectively 33.6 g/g, 33 seconds, and 6.9%.

EXAMPLE 4

A water-absorbent resin (4) of this invention was obtained by adding an aqueous cross-linking agent solution containing 0.2 part of ethylene glycol diglycidyl ether (produced by Nagase Kasei K.K. and marketed under trademark designation of "Denacol EX-810"), 9 parts of deionized water, 10 parts of isopropyl alcohol, 2 parts of lactic acid, and 0.02 part of polyoxyethylene sorbitan monostearate (produced by Kao Soap Co., Ltd. and marketed under trademark designation of "Rheodol TW-S120") to 100 parts of the water-absorbent resin (3) of this invention obtained in Example 3, mixing them, and heating the resultant mixture at 120° C. for 30 minutes. The capacity for water absorption, the water absorption speed, and the content of water-soluble component of the water-absorbent resin (4) of this invention were respectively 30.0 g/g, 26 seconds, and 5.9%.

EXAMPLE 5

An aqueous monomer solution containing 153 parts of acrylic acid, 1615 parts of 37% sodium acrylate, 4.9 parts of poly-ethylene glycol (n=8) diacrylate, and 710 parts of deionized water was prepared. This aqueous solution was intensely stirred fast under a current of nitrogen to displace the dissolved oxygen in the aqueous solution with nitrogen and disperse a large volume of nitrogen bubbles in the aqueous monomer solution. When the nitrogen gas was uniformly dispersed in the aqueous monomer solution and the volume of the solution was consequently increased to 1.07 times the original volume, 10 parts of an aqueous 10% sodium persulfate solution and 10 parts of an aqueous 10% sodium hydrogen sulfite solution were added to the resultant dispersion under fast intense stirring to start polymerization immediately. The stationary polymerization was left proceeding for 2 hours at a temperature in the range of 25°–75° C. with the bubbles in a dispersed state. The hydrogel polymer resulting from the polymerization and containing bubbles was cut into cubes of 5 mm and then dried in a hot air drier at 150° C. for 1 hour. Average pore diameter of bubbles in the hydrated gel polymer was 250 μm. The dried cubes of hydrogel polymer were pulverized with a pulverizer and the polymer particles that passed a sieve having meshes of 850 μm were separated to obtain a water-absorbent resin (5), 430 μm in average particle diameter, of this invention. The capacity for water absorption, the water absorption speed, and the content of water-soluble component of the water-absorbent resin (5) of this invention were respectively 3.15 g/g, 98 seconds, and 3.9%.

EXAMPLE 6

An aqueous monomer solution containing 153 parts of acrylic acid, 1615 parts of 37% sodium acrylate, 4.8 parts of poly-ethylene glycol (n=8) diacrylate, 0.8 part of an anionic surfactant (produced by Kao Soap Co., Ltd. and marketed under trademark designation of "Emal 20C") and 710 parts of deionized water was prepared. This aqueous solution was intensely stirred fast under a current of nitrogen to displace the dissolved oxygen in the aqueous solution with nitrogen and disperse a large volume of nitrogen bubbles in the aqueous monomer solution. When the nitrogen gas was uniformly dispersed in the aqueous monomer solution and the volume of the solution was consequently increased to 1.52 times the original volume, 10 parts of an aqueous 30% sodium persulfate solution and 10 parts of an aqueous 30% sodium hydrogen sulfite solution were added to the resultant dispersion under fast intense stirring to start polymerization immediately. The stationary polymerization was left proceeding for 3 hours at a temperature in the range of 25°–75° C. with the bubbles in a dispersed state. The hydrogel polymer resulting from the polymerization and containing bubbles copiously was cut into cubes of 10 mm to 30 mm and then dried in a hot air drier at 150° C. for one hour. Average pore diameter of bubbles in the hydrated gel polymer was 100 μm. The dried cubes of hydrogel polymer were pulverized with a pulverizer and the polymer particles that passed a sieve having meshes of 850 μm were separated to obtain a water-absorbent resin (6), 200 μm in average particle diameter, of this invention. The capacity for water absorption, the water absorption speed, and the content of water-soluble component of the water-absorbent resin (6) of this invention were respectively 3.48 g/g, 17 seconds, and 15.6%.

EXAMPLE 7

An aqueous monomer solution containing 153 parts of acrylic acid, 1615 parts of 37% sodium acrylate, 2.4 parts of poly-ethylene glycol (n=8) diacrylate, 0.33 part of a fluorine based nonionic surfactant (produced by Sumitomo-3M K.K. and marketed under trademark designation of "Fluorad FC-171"), and 710 parts of deionized water was prepared. This aqueous solution was intensely stirred fast under a current of nitrogen to displace the dissolved oxygen in the aqueous solution with nitrogen and disperse a large volume of nitrogen bubbles in the aqueous monomer solution. When the nitrogen gas was uniformly dispersed in the aqueous monomer solution and the volume of the solution was consequently increased to 1.09 times the original volume, 10 parts of an aqueous 10% sodium persulfate solution and 10 parts of an aqueous 10% sodium hydrogen sulfite solution were added to the resultant dispersion under fast intense stirring to start polymerization immediately. The stationary polymerization was left proceeding for 1 hour at a temperature in the range of 25°–75° C. with the bubbles in a dispersed state. The hydrogel polymer resulting from the polymerization and containing bubbles was cut into cubes of 5 mm and then dried in a hot air drier at 150° C. for one hour. Average pore diameter of the bubbles in the hydrated gel polymer was 200 μm. The dried cubes of hydrogel polymer were pulverized with a pulverizer and the polymer particles that passed a sieve having meshes of 850 μm were separated to obtain a water-absorbent resin (7), 360 μm in average particle diameter, of this invention. The capacity for water absorption, the water absorption speed, and the content of water-soluble component of the water-absorbent resin (1) of this invention were respectively 45.0 g/g, 61 seconds, and 13.6%.

EXAMPLE 8

An aqueous monomer solution containing 153 parts of acrylic acid, 1615 parts of 37% sodium acrylate, 6.9 parts of poly-ethylene glycol (n=8) diacrylate, 0.75 part of a fluorine based anionic surfactant (produced by Sumitomo-3M K.K. and marketed under trademark designation of "Fluorad FC-95"), and 710 parts of deionized water was prepared. This aqueous solution was intensely stirred fast under a current of nitrogen to displace the dissolved oxygen in the aqueous solution with nitrogen and disperse a large volume of nitrogen bubbles in the aqueous monomer solution. When the nitrogen gas was uniformly dispersed in the aqueous monomer solution and the volume of the solution was consequently increased to 1.09 times the original volume, 10 parts of an aqueous 10% sodium persulfate solution and 10 parts of an aqueous 10% sodium hydrogen sulfite solution were added to the resultant dispersion under fast intense stirring to start polymerization immediately. The stationary polymerization was left proceeding for 2 hours at a temperature in the range of 25°–75° C. with the bubbles in a dispersed state. The hydrogel polymer resulting from the polymerization and containing bubbles was cut into cubes of 5 mm and then dried in a hot air drier at 150° C. for one hour. Average pore diameter of the bubbles in the hydrated gel polymer was 150 μm. The dried cubes of hydrogel polymer were pulverized with a pulverizer and the polymer particles that passed a sieve having meshes of 850 μm were separated to obtain a water-absorbent resin (8), 420 μm in average particle diameter, of this invention. The capacity for water absorption, the water absorption speed, and the content of water-soluble component of the water-absorbent resin (8) of this invention were respectively 31.1 g/g, 102 seconds, and 4.1%.

EXAMPLE 9

An aqueous monomer solution containing 153 parts of acrylic acid, 1615 parts of 37% sodium acrylate, 4.9 parts of poly-ethylene glycol (n=8) diacrylate, 0.0099 part of a fluorine based cationic surfactant (produced by Sumitomo-3M K.K. and marketed under trademark designation of "Fluorad FC-135"), and 710 parts of deionized water was prepared. This aqueous solution was intensely stirred fast under a current of nitrogen to displace the dissolved oxygen in the aqueous solution with nitrogen and disperse a large volume of nitrogen bubbles in the aqueous monomer solution. When the nitrogen gas was uniformly dispersed in the aqueous monomer solution and the volume of the solution was consequently increased to 1.09 times the original volume, 10 parts of an aqueous 10% sodium persulfate solution and 10 parts of an aqueous 10% sodium hydrogen sulfite solution were added to the resultant dispersion under fast intense stirring to start polymerization immediately. The stationary polymerization was left proceeding for 3 hours at a temperature in the range of 25°–75° C. with the bubbles in a dispersed state. The hydrogel polymer resulting from the polymerization and containing bubbles was cut into cubes of 5 mm and then dried in a hot air drier at 150° C. for 1 hour. Average pore diameter of the bubbles in the hydrated gel polymer was 180 μm. The dried cubes of hydrogel polymer were pulverized with a pulverizer and the polymer particles that passed a sieve having meshes of 850 μm were separated to obtain a water-absorbent resin (9), 420 μm in average particle diameter, of this invention. The capacity for water absorption, the water absorption speed, and the content of water-soluble component of the water-absorbent resin (9) of this invention were respectively 36.6 g/g, 63 seconds, and 5.6%.

EXAMPLE 10

An aqueous monomer solution containing 153 parts of acrylic acid, 1615 parts of 37% sodium acrylate, 4.9 parts of poly-ethylene glycol (n=8) diacrylate, 1.5 parts of a nonionic surfactant (produced by Kao Soap Co., Ltd. and marketed under trademark designation of "Rheodol TW-S120"), and 710 parts of purified water was deionized. This aqueous solution was intensely stirred fast under a current of nitrogen to displace the dissolved oxygen in the aqueous solution with nitrogen and disperse a large volume of nitrogen bubbles in the aqueous monomer solution. When the nitrogen gas was uniformly dispersed in the aqueous monomer solution and the volume of the solution was consequently increased to 1.10 times the original volume, 10 parts of an aqueous 10% sodium persulfate solution and 10 parts of an aqueous 4% L-ascorbic acid solution were added to the resultant dispersion under fast intense stirring to start polymerization immediately. The stationary polymerization was left proceeding for two hours at a temperature in the range of 25°–75° C. with the bubbles in a dispersed state. The hydrogel polymer resulting from the polymerization and containing bubbles copiously was cut into cubes of 5 mm and then dried in a hot air drier at 150° C. for 1 hour. The dried cubes of hydrogel polymer were pulverized with a pulverizer and the polymer particles that passed a sieve having meshes of 850 µmm were separated to obtain a water-absorbent resin (10), 300 µm in average particle diameter, of this invention. The capacity for water absorption, the water absorption speed, and the content of water-soluble component of the water-absorbent resin (10) of this invention were respectively 40.8 g/g, 69 seconds, and 8.6%.

Control 1

An aqueous monomer solution containing 153 parts of acrylic acid, 1615 parts of 37% sodium acrylate, 4.9 parts of poly-ethylene glycol (n=8) diacrylate, and 710 parts of deionized water was prepared. This aqueous solution was placed under a current of nitrogen to remove the dissolved oxygen from the aqueous solution. Then, 10 parts of an aqueous 10% sodium persulfate solution and 10 parts of an aqueous 10% sodium hydrogen sulfite solution were added to the resultant solution without being intense stirred (at which time, the aqueous monomer solution did not admit the bubbles of nitrogen gas and retained the volume intact) and the monomer was polymerized at a temperature in the range of 25°–75° C. for 2 hours. The hydrogel polymer resulting from the polymerization was cut into cubes of about 5 mm and then dried in a hot air drier at 150° C. for 1 hour. The dried cubes of hydrogel polymer were pulverized with a pulverizer and the polymer particles that passed a sieve having meshes of 850 ìm were separated to obtain a water-absorbent resin (1) for comparison, 420 µm in average particle diameter. The capacity for water absorption, the water absorption speed, and the content of water-soluble component of the water-absorbent resin (1) for comparison were respectively 37.5 g/g, 112 seconds, and 6.1%.

EXAMPLE 11

An aqueous monomer solution containing 153 parts of acrylic acid, 1615 parts of 37% sodium acrylate, 4.1 parts of poly-ethylene glycol (n=8) diacrylate, and 710 parts of deionized water was prepared. Nitrogen was blown into this aqueous solution to remove the dissolved oxygen from the solution and then 1.5 parts of a siloxane type surfactant (produced by Nippon-Unicar K.K. and marketed under trademark designation of "Silwet FZ-2162") was added to the resultant solution. Then, the solution was subjected to fast intense stirring at 5000 rpm under a current of nitrogen to disperse bubbles of nitrogen copiously in the aqueous monomer solution. When the nitrogen gas was uniformly dispersed in the aqueous monomer solution and the volume of the solution was consequently increased to 1.36 times the original volume, 10 parts of an aqueous 10% sodium persulfate solution and 10 parts of an aqueous 10% sodium hydrogen sulfite solution were added to the resultant dispersion under fast intense stirring to start polymerization immediately. The stationary polymerization was left proceeding for 2 hours at a temperature in the range of 25°–75° C. with the bubbles in a dispersed state. The spongy hydrogel polymer resulting from the polymerization and containing bubbles copiously was cut into cubes of 10 mm to 50 mm and then dried in a hot air drier at 160° C. for 1 hour. The bubbles in the spongy hydrogel polymer had an average particle diameter of 101 µm. The dried cubes of hydrogel polymer were pulverized with a pulverizer and the polymer particles that passed a sieve having meshes of 850 µm were separated to obtain a water-absorbent resin (11), 380 µm in average particle diameter, of this invention. The capacity for water absorption, the water absorption speed, the content of water-soluble component, and the specific surface area of the water-absorbent resin (11) of this invention were respectively 41.0 g/g, 20 seconds, 8.9%, and 0.05 m$^2$/g. Average pore diameter of the surface was 108 µm. The water-absorbent resin composition was a foam having numerous pores in the interior and on the surface thereof as illustrated in FIG. 4.

EXAMPLE 12

An aqueous monomer solution containing 153 parts of acrylic acid, 1615 parts of 37% sodium acrylate, 4.1 parts of poly-ethylene glycol (n=8) diacrylate, and 710 parts of deionozed water was prepared. Nitrogen was blown into this aqueous solution to remove the dissolved oxygen from the solution and then 0.075 part of a siloxane type surfactant (produced by Nippon-Unicar K.K. and marketed under trademark designation of "Silwet FZ-2162") was added to the resultant solution. Then, the solution was subjected to fast intense stirring at 5000 rpm under a current of nitrogen to disperse bubbles of nitrogen copiously in the aqueous monomer solution. When the nitrogen gas was uniformly dispersed in the aqueous monomer solution and the volume of the solution was consequently increased to 1.17 times the original volume, 10 parts of an aqueous 10% sodium persulfate solution and 10 parts of an aqueous 10% sodium hydrogen sulfite solution were added to the resultant dispersion under fast intense stirring to start polymerization immediately. The stationary polymerization was left proceeding for 2 hours at a temperature the range of 25°–75° C. with the bubbles in a dispersed state. The spongy hydrogel polymer resulting from the polymerization and containing bubbles copiously was cut into cubes of 10 mm to 50 mm and then dried in a hot air drier at 160° C. for 1 hour. The bubbles in the spongy hydrogel polymer had an average particle diameter of 115 µm. The dried cubes of hydrogel polymer were pulverized with a pulverizer and the polymer particles that passed a sieve having meshes of 850 µm were separated to obtain a water-absorbent resin (12), 425 µm in average particle diameter, of this invention. The capacity for water absorption, the water absorption speed, the content of water-soluble component, and the specific surface area of the water-absorbent resin (12) of this invention were respectively 42.0 g/g, 29 seconds, 8.6%, and 0.04 m$^2$/g.

EXAMPLE 13

An aqueous monomer solution containing 153 parts of acrylic acid, 1615 parts of 37% sodium acrylate, 4.1 parts of poly-ethylene glycol (n=8) diacrylate, and 710 parts of deionized water was prepared. Nitrogen was blown into this aqueous solution to remove the dissolved oxygen from the solution and then 1.5 parts of a siloxane type surfactant (produced by Nippon-Unicar K.K. and marketed under trademark designation of "Silwet FZ-2162") was added to the resultant solution. Then, the solution was subjected to fast intense stirring at 5000 rpm under a current of nitrogen to disperse bubbles of nitrogen copiously in the aqueous monomer solution. When the nitrogen gas was uniformly dispersed in the aqueous monomer solution and the volume of the solution was consequently increased to 1.44 times the original volume, 10 parts of an aqueous 10% sodium persulfate solution and 10 parts of an aqueous 0.4% L-ascorbic acid solution were added to the resultant dispersion under fast intense stirring to start polymerization immediately. The stationary polymerization was left proceeding for 2 hours at a temperature the range of 25°–75° C. with the bubbles in a dispersed state. The spongy hydrogel polymer resulting from the polymerization and containing bubbles copiously was cut into cubes of 10 mm to 50 mm and then dried in a hot air drier at 160° C. for 1 hour. The bubbles in the spongy hydrogel polymer had an average particle diameter of 108 μm. The dried cubes of hydrogel polymer were pulverized with a pulverizer and the polymer particles that passed a sieve having meshes of 850 μm were separated to obtain a water-absorbent resin (13), 310 μm in average particle diameter, of this invention. The capacity for water absorption, the water absorption speed, the content of water-soluble component, and the specific surface area of the water-absorbent resin (13) of this invention were respectively 35.0 g/g, 22 seconds, 5.4%, and 0.05 m$^2$/g.

Control 2

An aqueous monomer solution containing 153 parts of acrylic acid, 1615 parts of 37% sodium acrylate, 4.1 parts of poly-ethylene glycol (n=8) diacrylate, and 710 parts of deionized water was prepared. Nitrogen was blown into this aqueous solution to remove the dissolved oxygen from the solution. Then, 10 parts of an aqueous 10% sodium persulfate solution and 10 parts of an aqueous 0.4% L-ascorbic acid solution were added to the resultant solution kept stirred under a current of nitrogen and the monomer was polymerized at a temperature in the range of 25°–75° C. for 2 hours to obtain a hydrogel polymer in the form of shredded particles. The hydrogel polymer in a dry state was pulverized with a pulverizer and the polymer particles that passed a sieve having meshes of 850 μm were separated to obtain a water-absorbent resin (2) for comparison, 430 μm in average particle diameter. The capacity for water absorption, the water absorption speed, and the content of water-soluble component of the water-absorbent resin (2) for comparison were respectively 42.5 g/g, 118 seconds, and 10.5%.

EXAMPLE 14

Figure 5:
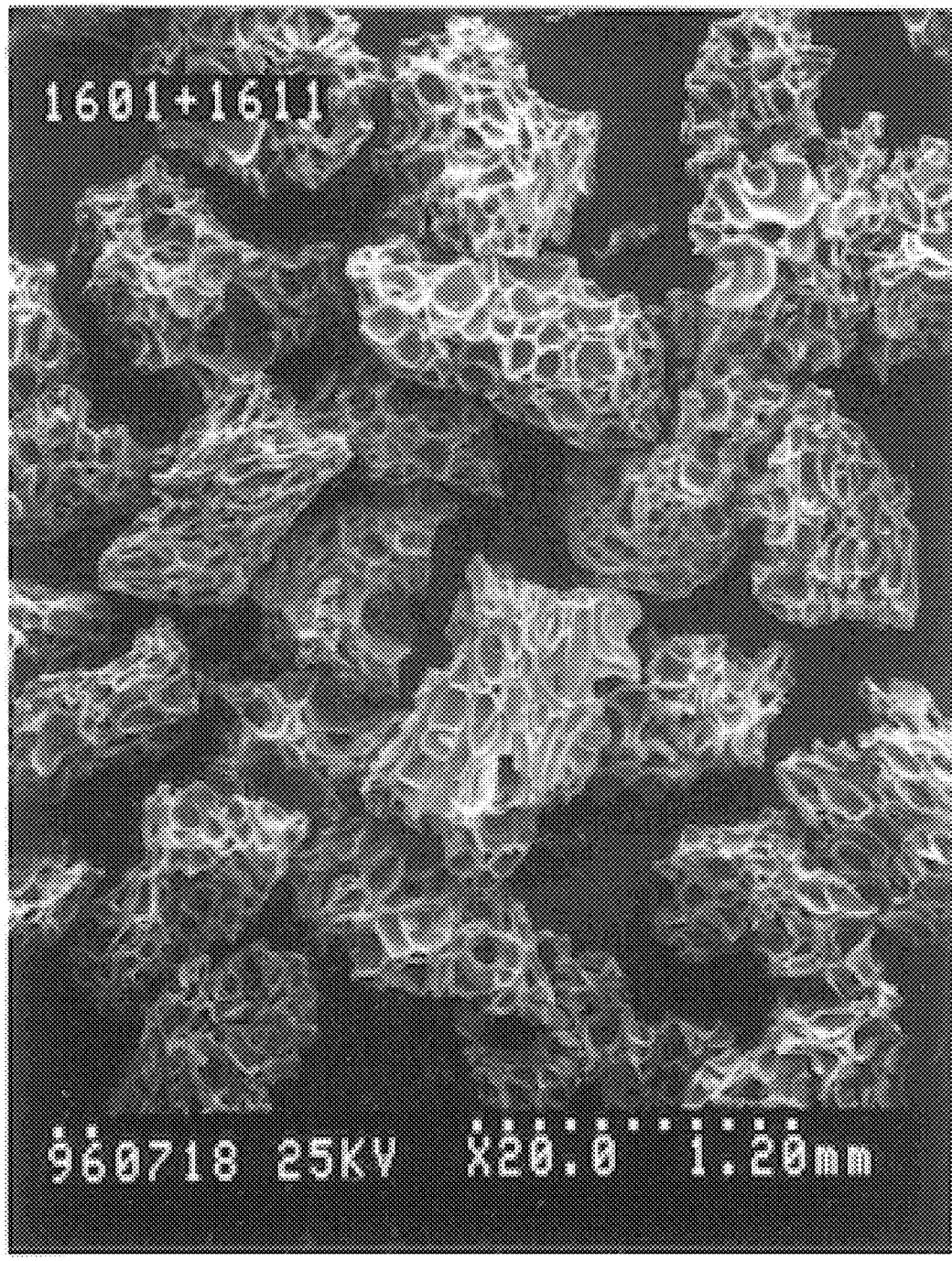
FIG. 5 is an electron micrograph showing the foamed state of a water-absorbent resin composition of this invention obtained in Example 1.

An aqueous monomer solution containing 153 parts of acrylic acid, 1615 parts of 37% sodium acrylate, 4.9 parts of poly-ethylene glycol (n=8) diacrylate, 0.75 part of a fluorine based anionic surfactant (produced by Sumitomo-3M K.K. and marketed under trademark designation of "Fluorad FC-95"), and 710 parts of deionized water was prepared. This aqueous solution was subjected to fast intense stirring under a current of nitrogen to displace the dissolved oxygen in the aqueous solution with nitrogen and disperse a large volume of nitrogen bubbles in the aqueous monomer solution. When the nitrogen gas was uniformly dispersed in the aqueous monomer solution and the volume of the solution was consequently increased to 1.58 times the original volume, 10 parts of an aqueous 10% sodium persulfate solution and 10 parts of an aqueous 5% sodium hydrogen sulfite solution were added to the resultant dispersion under fast intense stirring to start polymerization immediately. The stationary polymerization was left proceeding for 2 hours at a temperature in the range of 25°–75° C. with the bubbles in a dispersed state. The spongy hydrogel polymer resulting from the polymerization and containing bubbles copiously was cut into cubes of 10 mm to 50 mm and then dried in a hot air drier at 150° C. for 1 hour. The dried cubes of hydrogel polymer were pulverized with a pulverizer and the polymer particles that passed a sieve having meshes of 850 μm were separated to obtain a water-absorbent resin (14), 220 μm in average particle diameter, of this invention. The capacity for water absorption, the water absorption speed, and the content of water-soluble component of the water-absorbent resin (14) of this invention were respectively 31.1 g/g, 26 seconds, and 5.5%. The specific surface area of the water-absorbent resin (14) was 0.0512 m$^2$/g. The water-absorbent resin composition was a foam having numerous pores in the interior and on the surface thereof as illustrated in FIG. 5.

EXAMPLE 15

An aqueous monomer solution containing 153 parts of acrylic acid, 1615 parts of 37% sodium acrylate, 4.8 parts of poly-ethylene glycol (n=8) diacrylate, 0.0525 part of a fluorine based cationic surfactant (produced by Sumitomo-3M K.K. and marketed under trademark designation of "Fluorad FC-135"), and 710 parts of deionized water was prepared. This aqueous solution was subjected to fast intense stirring under a current of nitrogen to remove the dissolved oxygen from the aqueous solution. Then, 10 parts of an aqueous 10% sodium persulfate solution and 10 parts of an aqueous 10% sodium hydrogen sulfite solution were added to the resultant dispersion under fast intense stirring to effect stationary polymerization at a temperature in the range of 25°–75° C. for 2 hours. The hydrogel polymer resulting from the polymerization was shredded and dried in a hot air drier at 150° C. for 1 hour. The dried hydrogel polymer was pulverized with a pulverizer and the polymer particles that passed a sieve having meshes of 850 μm were separated to obtain a water-absorbent resin composition (15), 320 μm in average particle diameter, of this invention. The capacity for water absorption, the water absorption speed, and the content of water-soluble component of the water-absorbent resin (15) of this invention were respectively 36.0 g/g, 37 seconds, and 6.9%. The specific surface area of the water-absorbent resin (15) was 0.046 m$_2$/g.

EXAMPLE 16

An aqueous monomer solution containing 153 parts of acrylic acid, 1615 parts of 37% sodium acrylate, 4.9 parts of poly-ethylene glycol (n=8) diacrylate, 0.075 part of a fluorine type cationic surfactant (produced by Sumitomo-3M K.K. and marketed under trademark designation of "Fluorad FC-135"), and 710 parts of deionized water was prepared. This aqueous solution was subjected to fast intense stirring under a current of nitrogen to displace the dissolved oxygen in the aqueous solution with nitrogen and disperse a large volume of bubbles of nitrogen in the aqueous monomer solution. When the nitrogen gas was uniformly dispersed in the aqueous monomer solution and the volume of the solution was consequently increased to 1.09 times the original volume, 10 parts of an aqueous 10% sodium persulfate solution and 10 parts of an aqueous 10% sodium hydrogen sulfite solution were added to the resultant dispersion under fast intense stirring to start polymerization immediately and effect stationary polymerization for 2 hours at a temperature in the range of 25°–75° C. with the bubbles in a dispersed state. The hydrogel polymer resulting from the polymerization and containing bubbles was cut into cubes of 5 mm and dried in a hot air drier at 150° C. for 1 hour. The dried hydrogel polymer was pulverized with a pulverizer and the polymer particles that passed a sieve having meshes of 850 im were separated to obtain a water-absorbent resin composition (17), 366 μm in average particle diameter, of this invention. The capacity for water absorption, the water absorption speed, and the content of water-soluble component of the water-absorbent resin (17) of this invention were respectively 45.0 g/g, 61 seconds, and 13.6%. The specific surface area of the water-absorbent resin (17) was 0.0264 m²/g.

Control 3

An aqueous monomer solution containing 153 parts of acrylic acid, 1615 parts of 37% sodium acrylate, 4.9 parts of poly-ethylene glycol (n=8) diacrylate, and 710 parts of deionized water was prepared. This aqueous solution was stirred under a current of nitrogen to remove the dissolved oxygen from the aqueous solution. Then, 10 parts of an aqueous 10% sodium persulfate solution and 10 parts of an aqueous 0.4% L-ascorbic acid solution were added to the resultant solution to polymerize the monomer at a temperature in the range of 25°–75° C. for 2 hours and obtain a hydrogel polymer in the form of shredded particles. The hydrogel polymer consequently obtained was dried in a hot air drier at 150° C. for one hour. The hydrogel polymer in a dry state was pulverized with a pulverizer and the polymer particles that passed a sieve having meshes of 850 μmm were separated to obtain a water-absorbent resin (3) for comparison, 420 μm in average particle diameter. The capacity for water absorption, the water absorption speed, and the content of water-soluble component of the water-absorbent resin (3) for comparison were respectively 37.0 g/g, 130 seconds, and 4.9%. The specific surface area of this water-absorbent resin (3) for comparison was 0.0135 m²/g.

EXAMPLE 18

An aqueous monomer solution was prepared by mixing 306 g of acrylic acid, 3240 g of 37% sodium acrylate, 8.2 g of poly-ethylene glycol (n=8) diacrylate, 0.3 g of polyoxy-ethylene sorbitan monostearate (produced by Kao Soap Co., Ltd. and marketed under trademark designation of "Rheodol TW-S120"), 1420 g of deionized water, and 10 g of an aqueous 10% sodium persulfate solution. This aqueous monomer solution and nitrogen were subjected to fluid mixing by the use of a device produced by Aikosha Sei-sakusho K.K. and marketed under trademark designation of "Whip Auto Z" to disperse bubbles of nitrogen gas in the aqueous monomer solution and effect polymerization of the monomer having the bubbles dispersed therein. To be specific, this aqueous monomer solution 10 was supplied by means of the aspirator 12 at a rate of 1 kg per minute from the nozzle side and the nitrogen gas was supplied via the lateral pipe at a rate of 2 liters per minute and they were subjected to fluid mixing. The resultant mixture was passed through the mixing zone 8 provided with irregularities (protuberances or fins) 9 and led to the polymerization column 16. The aqueous monomer solution 10 which had passed the mixing zone 8 had bubbles of nitrogen dispersed therein and had the volume thereof increased to 1.5 times the original volume. To this aqueous monomer solution 13 containing bubbles, 10 g of an aqueous 10% sodium hydrogen sulfide solution was added to initiate polymerization of the monomer immediately. The stationary polymerization was continued at a temperature in the range of 25°–95° C. for 1 hour with the bubbles dispersed therein. The spongy hydrogel polymer resulting from the polymerization and containing bubbles copiously was cut into cubes of 10–30 mm and then dried in a hot air drier at 160° C. for 2 hours. The dried hydrogel polymer was pulverized with a pulverizer and the polymer particles that passed a sieve having meshes of 850 μm were separated to obtain a water-absorbent resin (18) of this invention, 250 μm in average particle diameter. The capacity for water absorption, the water absorption speed, and the content of water-soluble component of the water-absorbent resin (18) of this invention were respectively 40.0 g/g, 10 seconds, and 8%.

EXAMPLE 19

A hydrophilic polymer (19) of this invention having an average particle diameter 300 μm was obtained by following the procedure of Example 18 while using the polyoxyethylene sorbitan monostearate in an amount of 0.15 g. The capacity for water absorption, the water absorption speed, and the content of water-soluble component of the hydrophilic polymer (19) of this invention were respectively 4.05 g/g, 15 seconds, and 8%.

EXAMPLE 20

A hydrophilic polymer (20) of this invention having an average particle diameter 420 μm was obtained by following the procedure of Example 18 while using the polyoxyethylene sorbitan monostearate in an amount of 0.12 g. The capacity for water absorption, the water absorption speed, and the content of water-soluble component of the hydrophilic polymer (20) of this invention were respectively 45.5 g/g, 28 seconds, and 12%.

EXAMPLE 21

A hydrophilic polymer (21) of this invention having an average particle diameter 450 μm was obtained by following the procedure of Example 18 while using the polyoxyethylene sorbitan monostearate in an amount of 0.06 g. The capacity for water absorption, the water absorption speed, and the content of water-soluble component of the hydrophilic polymer (21) of this invention were respectively 46.2 g/g, 40 seconds, and 12.2%.

EXAMPLE 22

The aqueous monomer solution of Example 18 having bubbles dispersed therein was placed in a kneader, 10 liters in inner volume, and subjected to stationary polymerization. When the temperature of the polymer gel reached 60° C., the gel in the kneader was stirred to be disintegrated. The disintegrated gel was extracted from the kneader and then treated in the same manner as in Example 1 to obtain a hydrophilic polymer (22) of this invention having an average particle diameter of 440 μm. The capacity for water absorption, the water absorption speed, and the content of water-soluble component of the hydrophilic polymer (22) of this invention were respectively 42.2 g/g, 22 seconds, and 8.2%.

EXAMPLE 23

A hydrophilic polymer (23) of this invention having an average particle diameter 340 μm was obtained by following the procedure of Example 18 while using 0.3 g of a fluorine type cationic surfactant (produced by Sumitomo-3M K.K. and marketed under trademark designation of "Fluorad FC135") in the place of the polyoxyethylene sorbitan monostearate. The capacity for water absorption, the water absorption speed, and the content of water-soluble component of the hydrophilic polymer (23) of this invention were respectively 4.05 g/g, 9 seconds, and 8.5%.

EXAMPLE 24

A hydrophilic polymer (24) of this invention having an average particle diameter 320 μm was obtained by following the procedure of Example 18 while further solving 12 g of hydroxy-ethyl cellulose in the aqueous monomer solution and causing the aqueous monomer solution to exhibit a viscosity of 63 cP The capacity for water absorption, the water absorption speed, and the content of water-soluble component of the hydrophilic polymer (24) of this invention were respectively 42.5 g/g, 12 seconds, and 8.5%.

EXAMPLE 25

An aqueous monomer solution was prepared by mixing 118 g of acrylic acid, 0.3787 g of methylene bis-acrylamide, 0.059 g of a fluorine based cationic surfactant (produced by Sumitomo-3M K.K. and marketed under trademark designation of "Fluorad FC-135"), 7.07 g of an aqueous 5% V-50 (produced by Wako Pure Chemical Industries, Ltd.) solution, 5.9 g of an aqueous 0.1% L-ascorbic acid solution, and 401.4 g of deionized water. This aqueous monomer solution was subjected, together with nitrogen gas in the same manner as in Example 18, to fluid mixing to obtain an aqueous monomer solution having nitrogen gas dispersed therein. The produced solution showed an increase in volume to 1.6 times the original volume. Subsequently, 0.66 g of an aqueous 0.35% hydrogen peroxide solution was added to the aqueous monomer solution to initiate polymerization of the monomer immediately. Then, the ensuant stationary polymerization was continued at a temperature in the range of 18°–80° C. for 1 hour with bubbles dispersed therein. The hydrogel polymer resulting from the polymerization and having a large volume of bubbles dispersed therein was disintegrated with a twin-arm kneader. The disintegrated hydrogel polymer was extracted from the kneader, neutralized on a vat with 755.8 g of an aqueous 6.5% sodium hydroxide solution, and left aging until the neutralization was homogenized and the coloring reaction with phenol phthalein vanished. The ratio of neutralization of the carboxyl group contained in the hydrogel was 75%. The gel resulting from the neutralization was dried in a hot air drier at 160° C. for 1 hour and pulverized to obtain a hydrophilic polymer (25) of this invention. The capacity for water absorption, the water absorption speed, and the content of water-soluble component of the hydrophilic polymer (25) of this invention were respectively 58 g/g, 32 seconds, and 5.2%.

EXAMPLE 26

A hydrophilic polymer (26) of this invention was obtained by adding an aqueous cross-linking agent solution containing 0.25 part of ethylene glycol diglycidyl ether (produced by Nagase Kasei K.K. and marketed under trademark designation of "Denacol EX-810"), 2.5 parts of propylene glycol, 7.5 parts of purified water, and 5 parts of isopropyl alcohol to 100 parts of the hydrophilic polymer (19) obtained in Example 19, mixing them, and heat-treating the resultant mixture at 195° C. for 60 minutes. The capacity for water absorption, the water absorption speed, and the content of water-soluble component of the hydrophilic polymer (26) of this invention were respectively 29.5 g/g, 14 seconds, and 7.9%. The ratio of cubic expansion due to water absorption under pressure was 31.1 g/g.

EXAMPLE 27

A hydrophilic polymer (27) of this invention was obtained by adding a solution of a cross-linking agent containing 0.3 part of ethylene glycol diglycidyl ether (produced by Nagase Kasei K.K. and marketed under trademark designation of "Denacol EX-810"), 3 parts of propylene glycol, and 3 parts of isopropyl alcohol to 100 parts of the hydrophilic polymer (25) obtained in Example 25, mixing them, then adding a mixed solution consisting of 9 parts of water and 6 parts of isopropyl alcohol to the resultant mixture, mixing them, heat-treating a hydrophilic polymer (8) incorporating a surface cross-linking agent therein at 185° C. for 60 minutes, mixing the product of the heat treatment with 3 parts of an aqueous 0.33% polyoxyethylene sorbitan monostearate (produced by Kao Co., Ltd. and marketed under trademark registration of Rheodol TW-S120) methanol solution, and drying the resultant mixture at 80° C. The capacity for water absorption, the water absorption speed, and the content of water-soluble component of the hydrophilic polymer (27) of this invention were respectively 38.5 g/g, 28 seconds, and 5.2%. The ratio of cubic expansion due to water absorption under pressure was 33.6 g/g.

EXAMPLE 28

A hydrophilic polymer (28) of this invention was obtained by adding a solution of a cross-linking agent consisting of 0.3 part of ethylene glycol diglycidyl ether (produced by Nagase Kasei K.K. and marketed under trademark designation of "Rheodol EX-810"), 3 parts of propylene glycol, and 3 parts of isopropyl alcohol to 100 parts of the hydrophilic polymer (19) obtained in Example 19, mixing them, then adding a mixed solution consisting of 9 parts of water and 6 parts of isopropyl alcohol to the resultant mixture, mixing them, heat-treating a hydrophilic polymer (19) incorporating a surface cross-linking agent therein at 195° C. for 60 minutes, mixing the product of the heat treatment with 3 parts of a 0.33% polyoxyethylene sorbitan monostearate (produced by Kao Co., Ltd. and marketed under trademark registration of Rheodol TW-S120) methanol solution, and drying the resultant mixture at 80° C. The capacity for water absorption, the water absorption speed, and the content of water-soluble component of the hydrophilic polymer (28) of this invention were respectively 3.02 g/g, 13 seconds, and 8.2%. The ratio of cubic expansion due to water absorption under pressure was 33.2 g/g.

Control 4

An aqueous monomer solution was prepared by mixing 306 g of acrylic acid, 3240 g of an aqueous 37% sodium acrylate solution, 8.2 g of polyethylene glycol (n=8) diacrylate, and 1420 g of purified water in a beaker, 5 liters in inner volume. The viscosity of this aqueous monomer solution was 3 cP. Nitrogen was blown into the aqueous monomer solution to remove the dissolved oxygen from the solution. Then, in a twin-arm kneader having an inner volume of 10 liters, the aqueous monomer solution was placed and 10 g of an aqueous 10% sodium persulfate solution and 10 g of an aqueous 10% sodium hydrogen sulfide solution were added thereto as stirred to initiate the polymerization of the monomer immediately. The hydrogel polymer resulting from the polymerization was extracted from the kneader and broken into cubes of 10 mm to 50 mm and then dried in a hot air drier at 160° C. for 1 hour. The hydrogel polymer contained virtually no bubble. The dried cubes were pulverized with a pulverizer and the polymer particles that passed a sieve having meshes of 850 μm were separated to obtain a hydrophilic polymer (4) for comparison, 460 μm in average particle diameter, for comparison. The capacity for water absorption, the water absorption speed, and the content of water-soluble component of the hydrophilic polymer (4) for comparison were respectively 42.2 g/g, 126 seconds, and 9.0%.

EXAMPLE 29

An aqueous monomer solution containing of 441 g of acrylic acid, 4668 g of an aqueous 37% sodium acrylate solution, 6.5 g of polyethylene glycol (n=8) diacrylate, and 1418 g of deionized water was prepared, deaerated with nitrogen gas for 30 minutes, and supplied to a reaction vessel constructed by fitting a lid to a jacketed stainless steel twin-arm kneader having an inner volume of 10 liters and incorporating two sigma type vanes therein. In the reaction vessel, the monomer was kept at a temperature of 30° C. and the reaction system was displaced with nitrogen.

Then, the aqueous monomer solution was kept stirred and 34 g of an aqueous 10% sodium persulfate and 1.6 g of an aqueous 1% L-ascorbic acid solution were added thereto. The polymerization of the monomer was started in one minute and the peak temperature in the reaction system reached 78° C. in 15 minutes. The stirring was further continued and the hydrogel polymer was extracted from the reaction vessel in 35 minutes of starting the polymerization.

The minute particles of hydrogel polymer consequently obtained was dried with hot air at 160° C. for 60 minutes. The dried particles were pulverized with a roll mill and the polymer particles that passed a sieve having meshes of 212 μm and stopped on a sieve having meshes of 106 μm were separated to obtain water-absorbent resin particles (29).

A water-absorbent resin (29) of this invention was obtained by mixing a solution of a cross-linking agent consisting of 0.06 part of ethylene glycol diglycidyl ether (produced by Nagase Kasei K.K. and marketed under trademark designation of "Denacol EX-810"), 2 parts of propylene glycol, and 2 parts of isopropyl alcohol with 100 parts of the water-absorbent resin particles (29), mixing an aqueous liquid consisting of 6 parts of water and 4 parts of isopropyl alcohol with a mixture of the water-absorbent resin particles (29) with a cross-linking agent, and heating the resultant mixture at 185° C. for 40 minutes. The water-absorbent resin particles showed virtually no sign of coagulation.

The capacity for water absorption of the produced water-absorbent resin (29) was 40 (g/g), the ratio of cubic expansion under load thereof was 36.4 (g/g), the water absorption speed thereof was 20 seconds, the content of water-soluble component thereof was 14%, and the average particle diameter thereof was 160 μm.

EXAMPLE 30

In a container having an inner volume of 5 liters, an aqueous monomer solution consisting of 720 g of acrylic acid, 4.8 g of polyethylene glycol (n=8) diacrylate, and 2862 g of purified water was prepared, deaerated with nitrogen gas for 30 minutes, and then kept at a temperature of 20° C.

Then, 4.8 g of an aqueous 5% 2,2'-azobis(2-amidinopropane) dihydrochloride solution, 8.6 g of an aqueous 0.5% L-ascorbic acid solution, and 4 g of an aqueous 0.35% hydrogen peroxide solution were added to the monomer to effect stationary polymerization. The polymerization of the monomer started in 30 minutes and the peak temperature in the reaction system reached 70° C. in 80 minutes. The polymerization system was left standing further for 60 minutes and the hydrogel polymer consequently formed was extracted from the container. The hydrogel polymer was disintegrated with a twin-arm kneader and neutralized meanwhile by the addition of 412 g of sodium carbonate powder. The disintegrated hydrogel polymer was extracted from the kneader. On a vat, it was combined with 5000 g of purified water and left aging until the neutralization was homogenized and the colorizing reaction with phenol phthaleine vanished. The ratio of neutralization of the carboxyl group contained in the hydrogel was mol 75%. The gel resulting from the neutralization was dried with a hot air drier at 160° C. for one hour. The dried gel was pulverized with a roll mill and sifted and the polymer particles that passed a sieve having meshes of 212 μm and stopped on a sieve having meshes of 150 μm were separated to obtain a water-absorbent resin particles (30).

A water-absorbent resin (30) of this invention was obtained by mixing a solution of a cross-linking agent consisting of 0.1 part of ethylene glycol diglycidyl ether (produced by Nagase Kasei K.K. and marketed under trademark designation of "Denacol EX-810"), 2 parts of propylene glycol, and 2 parts of isopropyl alcohol with 100 parts of the water-absorbent resin particles (30), mixing an aqueous liquid consisting of 6 parts of water and 4 parts of isopropyl alcohol with a mixture of the water-absorbent resin particles (30) with a cross-linking agent, and heating the resultant mixture at 185° C. for 50 minutes. The water-absorbent resin particles showed virtually no sign of coagulation.

The capacity for water absorption of the produced water-absorbent resin (30) was 45.4 (g/g), the ratio of cubic expansion under load thereof was 38.7 (g/g), the water absorption speed thereof was 26 seconds, the content of water-soluble component thereof was 7%, and the average particle diameter thereof was 180 μm.

EXAMPLE 31

A water-absorbent resin particles (31) were obtained by sifting the pulverized polymer particles obtained in Example 30 and separating the polymer particles that passed a sieve having meshes of 121 μm and stopped on a sieve having meshes of 104 μm.

A water-absorbent resin (31) of this invention was obtained by mixing a solution of a cross-linking agent consisting of 0.125 part of ethylene glycol diglycidyl ether (produced by Nagase Kasei K.K. and marketed under trademark designation of "Denacol EX-810"), 2.5 parts of propylene glycol, and 2.5 parts of isopropyl alcohol with 100 parts of the water-absorbent resin particles (31), mixing an aqueous liquid consisting of 7.5 parts of water and 5 parts of isopropyl alcohol with a mixture of the water-absorbent resin particles (31) with a cross-linking agent, and heating the resultant mixture at 185° C. for 35 minutes. The water-absorbent resin particles showed virtually no sign of coagulation.

The capacity for water absorption of the produced water-absorbent resin (31) was 42.4 (g/g), the ratio of cubic expansion under load thereof was 37.8 (g/g), the water absorption speed thereof was 22 seconds, the content of water-soluble component thereof was 8%, and the average particle diameter thereof was 140 μm.

EXAMPLE 32

An aqueous monomer solution containing of 36 g of acrylic acid, 381 g of an aqueous 37% sodium acrylate solution, 0.15 g of N,N'-methylene bis-acrylamide, and 173 g of deionized water. This aqueous monomer solution, with 0.24 g of sodium persulfate solved therein, was blown with nitrogen gas to expel the dissolved oxygen.

In a four-neck separable flask having an inner volume of 2 liters and provided with a stirrer, a reflux condenser, a thermometer, a nitrogen gas inlet pipe, and a dropping funnel, 3 g of sorbitan monostearate (HLB 4.7) as a dispersing agent was solved in 1 liter of cyclohexane and the resultant solution was blown with nitrogen gas to expel the dissolved oxygen.

Then, the aqueous monomer solution was added to the separable flask and stirred therein at 230 rpm to be dispersed therein. The bath temperature was elevated to 65° C. to initiate the polymerization reaction and this temperature was retained for two hours to complete the polymerization. The polymer solution was azeotropically dehydrated to remove substantially all the water and then filtered. The filtrate was dried overnight under a reduced pressure at 100° C. to obtain spherical water-absorbent resin particles (32). The average particle diameter of the water-absorbent resin particles (32) was 110 μm.

A water-absorbent resin (32) of this invention was obtained by mixing a solution of a cross-linking agent containing of 0.05 part of ethylene glycol diglycidyl ether (produced by Nagase Kasei K.K. and marketed under trademark designation of "Denacol EX-810"), 1 part of propylene glycol and 1 part of isopropyl alcohol with 100 parts of the water-absorbent resin particles (32), mixing an aqueous liquid consisting of 3 parts of water and 2 parts of isopropyl alcohol with a mixture of the water-absorbent resin particles (32) with a cross-linking agent, and heating the resultant mixture at 150° C. for 10 minutes. The water-absorbent resin particles showed virtually no sign of coagulation.

The capacity for water absorption of the produced water-absorbent resin (32) was 39 (g/g), the ratio of cubic expansion under load thereof was 39.4 (g/g), the water absorption speed thereof was 20 seconds, the content of water-soluble component thereof was 18%, and the average particle diameter thereof was 120 μm.

EXAMPLE 33

The dried polymer particles obtained in Example 32 were sifted and the polymer particles that passed a sieve having meshes of 104 μm and stopped on a sieve having meshes of 75 ìm were separated to obtain water-absorbent resin particles (33).

A water-absorbent resin (33) of this invention was obtained by mixing a solution of a cross-linking agent containing of 0.05 part of ethylene glycol diglycidyl ether (produced by Nagase Kasei K.K. and marketed under trademark designation of "Denacol EX-810"), 1 part of propylene glycol and 1 part of isopropyl alcohol with 100 parts of the water-absorbent resin particles (33), mixing an aqueous liquid consisting of 3 parts of water and 2 parts of isopropyl alcohol with a mixture of the water-absorbent resin particles (33) with a cross-linking agent, and heating the resultant mixture at 150° C. for 10 minutes. The water-absorbent resin particles showed virtually no sign of coagulation.

The capacity for water absorption of the produced water-absorbent resin (33) was 38.8 (g/g), the ratio of cubic expansion under load thereof was 39.8 (g/g), the water absorption speed thereof was 9 seconds, and the content of water-soluble component thereof was 18%.

Control 5

A water-absorbent resin (5) for comparison was obtained by adding an aqueous solution of a cross-linking agent consisting of 0.06 part of ethylene glycol diglycidyl ether (produced by Nagase Kasei K.K. and marketed under trademark designation of "Denacol EX-810"), 2 parts of propylene glycol, 6 parts of purified water, and 6 parts of isopropyl alcohol with 100 parts of the water-absorbent resin particles (29) obtained in Example 29, mixing them, heating the resultant mixture at 185° C. for 40 minutes, and sifting the mixture through a sieve having meshes of 300 μm. The ratio of a coagulation in the mixture was 10%.

The capacity for water absorption of the produced water-absorbent resin (5) for comparison was 38 (g/g), the ratio of cubic expansion under load thereof was 28.5 (g/g), the water absorption speed thereof was 24 seconds, the content of water-soluble component thereof was 16%, and the average particle diameter thereof was 180 μm.

Control 6

A water-absorbent resin (6) for comparison was obtained by mixing an aqueous solution of a cross-linking agent consisting of 0.1 part of ethylene glycol diglycidyl ether (produced by Nagase Kasei K.K. and marketed under trademark designation of "Denacol EX-810"), 2 parts of propylene glycol, 6 parts of purified water, and 6 parts of isopropyl alcohol with 100 parts of the water-absorbent resin particles (30) obtained in Example 30 and heating the resultant mixture at 185° C. for 50 minutes. The ratio of a coagulation in the mixture was about 15%.

The capacity for water absorption of the produced water-absorbent resin (6) for comparison was 43.9 (g/g), the ratio of cubic expansion under load thereof was 32.6 (g/g), the water absorption speed thereof was 27 seconds, the content of water-soluble component thereof was 7%, and the average particle diameter thereof was 190 μm.

The entire disclosure of Japanese Patent Application Nos. 8-241434 filed on Aug. 23, 1996 and 9-062701 filed on Mar. 17, 1997 including specification, claims, drawings and summary are incorporated herein by reference in its entirety.

What is claimed is:

1. A method for the production of a water-absorbent resin capable of fast water absorption, comprising the steps of dispersing bubbles of an inert gas in an aqueous monomer solution of a mixture of a water-soluble unsaturated monomer and a water-soluble cross-linking monomer which contains a surfactant and subjecting said mixture to copolymerization, wherein the inert gas is dispersed in the monomer solution to increase the volume of said monomer solution in the range of 1.02 to 5 times of the volume of said monomer solution in a non-dispersed state and wherein the dispersion of said bubbles is accomplished by introducing said inert gas into said aqueous solution.

2. A method according to claim 1, wherein the inert gas bubbles are dispersed so that an average pore diameter of the dispersed inert gas is in the range of 10 to 500 μm.

3. A method according to claim 1, wherein the amount of said surfactant is in the range of 0.001–30 parts by weight, based on 100 parts by weight of the total amount of said water-soluble unsaturated monomer and said water-soluble cross-linking monomer.

4. A method according to claim 1, wherein the volume of said aqueous monomer solution having the bubbles of said inert gas dispersed therein is not less than 1.08 to 4 times the volume of said solution having no inert gas dispersed therein.

5. A method according to claim 1, wherein the dispersion of said bubbles is accomplished by forced agitation of said aqueous solution at a high speed.

6. A method according to claim 1, wherein the dispersion of said bubbles is accomplished by adding a foaming agent to said aqueous solution.

7. A method according to claim 1, wherein the copolymerization is carried out using a redox polymerization initiator.

8. A method according to claim 1, which further comprises treating the produced water-absorbent resin with a surface cross-linking agent.

9. A water-absorbent resin capable of fast absorption of water, produced by the method set forth in claim 1.

10. A method for the production of a hydrophilic polymer, comprising the steps of mixing an aqueous monomer solution containing a water-soluble ethylenically unsaturated monomer and a gas by fluid mixing thereby obtaining an aqueous monomer solution having bubbles dispersed therein and then polymerizing the monomer in the state of having said bubbles dispersed therein.

11. A method according to claim 10, wherein said aqueous monomer solution and said gas are mixed by causing either of said two fluids to be spouted through a nozzle into a current of the other fluid parallelly to the current.

12. A method according to claim 10 wherein the mixing of said aqueous monomer solution and said gas is accomplished by introducing said two fluids into a mixing zone provided with irregularities and/or packing.

13. A method according to claim 10, wherein said aqueous monomer solution contains a surfactant.

14. A method according to claim 10, wherein said gas is an inert gas.

15. A method according to claim 10, wherein said aqueous monomer solution contains a cross-linking agent.

16. A method according to claim 10, which further comprises subjecting the produced hydrophilic polymer to a surface treatment.

17. A method for the production of a water-absorbent resin, comprising a step of mixing water-absorbent resin particles with either a surface cross-linking agent containing at least two groups capable of reacting with the functional group contained in said water-absorbent resin or a mixed solution of said cross-linking agent and an organic solvent, a step of mixing said mixture of said water-absorbent resin particles and said surface cross-linking agent with an aqueous liquid, and then a step of reacting said water-absorbent resin with said surface cross-linking agent.

18. A method according to claim 17, wherein said surface cross-linking agent contains at least two kinds of surface cross-linking agents differing in reactivity.

19. A method according to claim 17, wherein said aqueous liquid is water or a mixed solvent of water and a water-soluble organic solvent.

* * * * *